US012321084B2

(12) United States Patent
Liang et al.

(10) Patent No.: US 12,321,084 B2
(45) Date of Patent: Jun. 3, 2025

(54) INTERCONNECT MECHANISM FOR IMAGE CAPTURE DEVICE

(71) Applicant: GoPro, Inc., San Mateo, CA (US)

(72) Inventors: Bessy Wen-Han Liang, San Jose, CA (US); Nicholas D. Woodman, Big Sky, MT (US); Nicholas Vitale, Foster City, CA (US); Huy Phuong Nguyen, Alpine, UT (US)

(73) Assignee: GoPro, Inc., San Mateo, CA (US)

( * ) Notice: Subject to any disclaimer, the term of this patent is extended or adjusted under 35 U.S.C. 154(b) by 126 days.

(21) Appl. No.: 18/231,412

(22) Filed: Aug. 8, 2023

(65) Prior Publication Data
US 2024/0053660 A1 Feb. 15, 2024

Related U.S. Application Data

(60) Provisional application No. 63/397,454, filed on Aug. 12, 2022.

(51) Int. Cl.
*G03B 17/56* (2021.01)
*G03B 17/04* (2021.01)
(Continued)

(52) U.S. Cl.
CPC .............. *G03B 17/04* (2013.01); *G03B 17/12* (2013.01); *G03B 17/55* (2013.01); *G03B 17/565* (2013.01)

(58) Field of Classification Search
CPC .................................................. G03B 17/565
See application file for complete search history.

(56) References Cited

U.S. PATENT DOCUMENTS 1,467,556 A 9/1923 Nagel
1,612,277 A 12/1926 Leo
(Continued)

FOREIGN PATENT DOCUMENTS

CA 168972 4/1916
CN 1531337 A 9/2004
(Continued)

OTHER PUBLICATIONS

'Day of the (most recent) update in DPMAregister' (German Patent and Trademark Office) Jul. 5, 2014 (Jul. 5, 2014), 19 Pages, [Online] retrieved from DPMAregister <URL:https://register.dpma.de/DPMAregister/pat/register/PAT2020130052392_2015-10-137AKZ=2020130052392&VIEW=pdf >, (used to establish publication date of 'File Inspection' publication by Maas listed directly above).
(Continued)

*Primary Examiner* — Leon W Rhodes, Jr.
(74) *Attorney, Agent, or Firm* — Young Basile Hanlon & MacFarlane, P.C.

(57) ABSTRACT

A camera housing includes a first surface and a second surface noncoplanar with the first surface. A first interconnect mechanism is coupled to the first surface and rotatable between a collapsed position and an extended position. In the collapsed position, protrusions of the first interconnect mechanism extend parallel to the first surface. In the extended position, the protrusions of the first interconnect mechanism extend in a perpendicular manner away from the first surface. A second interconnect mechanism is coupled to the second surface and rotatable between a collapsed position and an extended position. In the collapsed position, protrusions of the second interconnect mechanism include coplanar surfaces and extend adjacent to the second surface. In the extended position, the protrusions of the second
(Continued)

interconnect mechanism extend in a perpendicular manner away from the second surface.

19 Claims, 4 Drawing Sheets

(51) Int. Cl.
*G03B 17/12* (2021.01)
*G03B 17/55* (2021.01)

(56) References Cited

U.S. PATENT DOCUMENTS

| | | | |
|---|---|---|---|
| D96,348 S * | 7/1935 | Teague | D16/217 |
| D118,296 S | 12/1939 | Tuomey | |
| 2,651,981 A | 9/1953 | Calhoun | |
| 2,890,067 A | 6/1959 | Morin | |
| 2,962,251 A | 11/1960 | Nikolaus | |
| 3,073,227 A | 1/1963 | Richard | |
| 3,508,482 A | 4/1970 | Taylor | |
| D219,768 S | 1/1971 | Conwill | |
| 3,721,746 A | 3/1973 | Knappenberger | |
| 3,762,797 A | 10/1973 | Heller | |
| 3,776,649 A | 12/1973 | Kemezys | |
| 3,860,937 A | 1/1975 | Wolfe | |
| D243,618 S | 3/1977 | Kaye | |
| D243,655 S | 3/1977 | Matousek | |
| 4,025,930 A | 5/1977 | Wolff | |
| 4,091,402 A | 5/1978 | Siegel | |
| 4,208,028 A | 6/1980 | Brown | |
| D260,513 S | 9/1981 | Comstock | |
| D272,392 S | 1/1984 | Bigelow | |
| 4,469,423 A | 9/1984 | Bresson | |
| 4,646,141 A | 2/1987 | Timmermans | |
| 4,733,259 A | 3/1988 | Ng | |
| 4,763,151 A | 8/1988 | Klinger | |
| D299,651 S | 1/1989 | Preussner | |
| 4,837,817 A | 6/1989 | Maemori | |
| 4,864,335 A | 9/1989 | Corrales | |
| 4,887,161 A | 12/1989 | Watanabe | |
| 4,888,795 A | 12/1989 | Ando | |
| 5,021,813 A | 6/1991 | Corrales | |
| D321,705 S | 11/1991 | Ohmura | |
| 5,092,458 A | 3/1992 | Yokoyama | |
| D328,888 S | 8/1992 | Zhu | |
| D329,040 S | 9/1992 | Seki | |
| D334,169 S | 3/1993 | Antonczak | |
| 5,216,371 A | 6/1993 | Nagai | |
| D338,220 S | 8/1993 | Kohno | |
| D339,365 S | 9/1993 | Urcuilio | |
| 5,244,326 A | 9/1993 | Henriksen | |
| 5,294,988 A | 3/1994 | Wakabayashi | |
| D348,043 S | 6/1994 | Hamilton | |
| 5,327,265 A | 7/1994 | McDonald | |
| 5,336,086 A | 8/1994 | Simmen | |
| D354,739 S | 1/1995 | Durham | |
| 5,400,234 A | 3/1995 | Yu | |
| 5,429,466 A | 7/1995 | Nagayama | |
| D363,562 S | 10/1995 | Schildt | |
| 5,485,357 A | 1/1996 | Zolninger | |
| 5,486,852 A | 1/1996 | Arai | |
| 5,505,424 A | 4/1996 | Niemann | |
| D372,896 S | 8/1996 | Nagele | |
| D373,947 S | 9/1996 | Parduhn | |
| 5,563,661 A | 10/1996 | Takahashi | |
| 5,627,587 A | 5/1997 | Murata | |
| 5,657,081 A | 8/1997 | Kurahashi | |
| 5,661,823 A | 8/1997 | Yamauchi | |
| D385,283 S | 10/1997 | Snyder | |
| D386,147 S | 11/1997 | Siddoway | |
| D391,217 S | 2/1998 | Pingel | |
| D392,659 S | 3/1998 | Takano | |
| 5,729,289 A | 3/1998 | Etoh | |
| 5,769,370 A | 6/1998 | Ashjaee | |
| 5,775,558 A | 7/1998 | Montalbano | |
| 5,805,219 A | 9/1998 | Ejima | |
| 5,808,663 A | 9/1998 | Okaya | |
| D400,496 S | 11/1998 | Barber | |
| 5,842,069 A | 11/1998 | Konno | |
| D402,955 S | 12/1998 | Smith | |
| D404,356 S | 1/1999 | Higgins | |
| D407,098 S | 3/1999 | Goto | |
| 5,887,375 A | 3/1999 | Watson | |
| D408,796 S | 4/1999 | Georgopulos | |
| D409,160 S | 5/1999 | Sonntag | |
| D412,153 S | 7/1999 | Chen | |
| 5,926,218 A | 7/1999 | Smith | |
| 5,938,492 A | 8/1999 | Carlini | |
| 5,946,501 A | 8/1999 | Hayakawa | |
| 5,969,750 A | 10/1999 | Hsieh | |
| D418,044 S | 12/1999 | Schoeneweis | |
| D418,107 S | 12/1999 | Murray, III | |
| 6,034,728 A | 3/2000 | Arena | |
| 6,035,147 A | 3/2000 | Kurosawa | |
| D423,449 S | 4/2000 | Naskali | |
| 6,104,887 A | 8/2000 | Hamasaki | |
| 6,118,929 A | 9/2000 | Kawamura | |
| D432,493 S | 10/2000 | Killebrew | |
| 6,128,441 A | 10/2000 | Kamata | |
| 6,138,826 A | 10/2000 | Kanamori | |
| 6,153,834 A | 11/2000 | Cole | |
| D437,772 S | 2/2001 | Erwin | |
| D439,218 S | 3/2001 | Yu | |
| D441,386 S | 5/2001 | Yamazaki | |
| D442,982 S | 5/2001 | Adachi | |
| 6,233,400 B1 | 5/2001 | Muramatsu | |
| D449,577 S | 10/2001 | Nishio | |
| 6,315,180 B1 | 11/2001 | Watkins | |
| 6,332,146 B1 | 12/2001 | Jebens | |
| 6,360,928 B1 | 3/2002 | Russo | |
| D456,006 S | 4/2002 | Maher | |
| 6,380,713 B2 | 4/2002 | Namura | |
| D457,132 S | 5/2002 | Petherbridge | |
| D460,411 S | 7/2002 | Wang | |
| D460,474 S | 7/2002 | Gotham, Sr. | |
| D462,893 S | 9/2002 | Sung | |
| D463,469 S | 9/2002 | Kawase | |
| D463,774 S | 10/2002 | Buck | |
| 6,480,671 B2 | 11/2002 | Takahashi | |
| 6,483,542 B1 | 11/2002 | Morinaga | |
| D467,605 S | 12/2002 | Dordick | |
| 6,530,784 B1 | 3/2003 | Yim | |
| D474,489 S | 5/2003 | Kawashima | |
| 6,583,809 B1 | 6/2003 | Fujiwara | |
| D480,682 S | 10/2003 | Kawase | |
| D480,741 S | 10/2003 | Berger | |
| D481,995 S | 11/2003 | Yokota | |
| 6,654,235 B2 | 11/2003 | Imsand | |
| D483,329 S | 12/2003 | Kuo | |
| D483,789 S | 12/2003 | Dordick | |
| D484,164 S | 12/2003 | Ogura | |
| D486,510 S | 2/2004 | Ogura | |
| D487,765 S | 3/2004 | Dow | |
| 6,718,129 B1 | 4/2004 | Cornell | |
| 6,727,954 B1 | 4/2004 | Hiroyuki | |
| D490,370 S | 5/2004 | Picardo | |
| 6,741,287 B1 | 5/2004 | Fuchimukai | |
| D491,137 S | 6/2004 | Suzuki | |
| D491,968 S | 6/2004 | Isshiki | |
| D492,248 S | 6/2004 | Gregory | |
| D492,893 S | 7/2004 | Oddsen, Jr. | |
| D494,450 S | 8/2004 | Schultz | |
| D494,940 S | 8/2004 | Fiocchi | |
| D496,674 S | 9/2004 | Hayashi | |
| 6,809,759 B1 | 10/2004 | Chiang | |
| D504,904 S | 5/2005 | Nagai | |
| D509,189 S | 9/2005 | Buck | |
| D510,721 S | 10/2005 | Axelrod | |
| 6,955,484 B2 | 10/2005 | Woodman | |
| D511,960 S | 11/2005 | Ogino | |
| D512,371 S | 12/2005 | Axelrod | |
| D515,121 S | 2/2006 | Bleau | |
| D515,613 S | 2/2006 | Holmes | |
| D515,910 S | 2/2006 | Gates | |

(56) References Cited

U.S. PATENT DOCUMENTS

| | | |
|---|---|---|
| D516,502 S | 3/2006 | Small |
| D516,503 S | 3/2006 | Takeshita |
| 7,011,460 B1 | 3/2006 | Todd |
| D521,445 S | 5/2006 | Liu |
| D521,446 S | 5/2006 | Liu |
| D523,808 S | 6/2006 | Thor |
| 7,060,921 B2 | 6/2006 | Kubo |
| D524,241 S | 7/2006 | Takeshita |
| D524,836 S | 7/2006 | Morita |
| 7,077,582 B2 | 7/2006 | Johnson |
| D526,612 S | 8/2006 | Sugeno |
| D527,403 S | 8/2006 | Byun |
| D531,199 S | 10/2006 | Matsuda |
| 7,129,981 B2 | 10/2006 | Berstis |
| D532,029 S | 11/2006 | Kim |
| D532,030 S | 11/2006 | Yoshida |
| D532,433 S | 11/2006 | Sato |
| D533,574 S | 12/2006 | Hamamura |
| D534,564 S | 1/2007 | Tainaka |
| D535,249 S | 1/2007 | Ogasawara |
| D535,253 S | 1/2007 | Buck |
| D538,322 S | 3/2007 | Horikiri |
| 7,185,862 B1 | 3/2007 | Yang |
| 7,196,722 B2 | 3/2007 | White |
| D544,463 S | 6/2007 | Harris, Jr. |
| 7,226,261 B1 | 6/2007 | Bristol |
| D546,277 S | 7/2007 | Andre |
| D551,969 S | 10/2007 | Aurilio |
| 7,285,879 B2 | 10/2007 | Osaka |
| D555,587 S | 11/2007 | Yamamoto |
| 7,295,388 B2 | 11/2007 | Shyu |
| D556,803 S | 12/2007 | Ishida |
| D559,083 S | 1/2008 | Brassard |
| D561,092 S | 2/2008 | Kim |
| 7,327,396 B2 | 2/2008 | Schultz |
| 7,337,403 B2 | 2/2008 | Pavley |
| D566,151 S | 4/2008 | Won |
| 7,362,352 B2 | 4/2008 | Ueyama |
| 7,379,664 B2 | 5/2008 | Marcus |
| D571,188 S | 6/2008 | Brassard |
| D576,486 S | 9/2008 | Koza |
| D577,729 S | 9/2008 | Derry |
| D577,731 S | 9/2008 | Altonji |
| 7,440,693 B2 | 10/2008 | Kouchi |
| D581,255 S | 11/2008 | Calvin |
| D582,955 S | 12/2008 | Sekine |
| 7,463,304 B2 | 12/2008 | Murray |
| 7,464,215 B2 | 12/2008 | Kawai |
| D584,683 S | 1/2009 | Preliasco |
| 7,496,293 B2 | 2/2009 | Shamir |
| 7,508,420 B2 | 3/2009 | Kitajima |
| D590,334 S | 4/2009 | Tatehata |
| D591,325 S | 4/2009 | Dordick |
| 7,537,399 B2 | 5/2009 | Mayumi |
| D594,047 S | 6/2009 | Lee |
| D594,497 S | 6/2009 | Hatori |
| 7,543,327 B1 | 6/2009 | Kaplinsky |
| D596,217 S | 7/2009 | Kim |
| D596,658 S | 7/2009 | Dordick |
| 7,612,821 B1 | 11/2009 | Hsia |
| 7,613,386 B2 | 11/2009 | Shimamura |
| 7,626,621 B2 | 12/2009 | Ito |
| 7,643,056 B2 | 1/2010 | Silsby |
| 7,653,292 B2 | 1/2010 | Yamaguchi |
| D610,539 S | 2/2010 | Dahan |
| 7,656,294 B2 | 2/2010 | Boss |
| 7,663,666 B2 | 2/2010 | Kawai |
| 7,671,886 B2 | 3/2010 | Sawada |
| 7,674,081 B2 | 3/2010 | Selle |
| 7,683,968 B2 | 3/2010 | Hagihara |
| D616,286 S | 5/2010 | Foresman |
| D616,480 S | 5/2010 | Ookawa |
| D616,742 S | 6/2010 | Lymn |
| D617,360 S | 6/2010 | Endo |
| 7,728,905 B2 | 6/2010 | Tanaka |
| 7,752,732 B2 | 7/2010 | Brown |
| D621,860 S | 8/2010 | Fukano |
| D622,591 S | 8/2010 | Biesecker, II |
| 7,768,727 B2 | 8/2010 | Iida |
| 7,801,425 B2 | 9/2010 | Fantone |
| 7,801,439 B2 | 9/2010 | Nagata |
| D625,750 S | 10/2010 | Dittmer |
| 7,823,771 B2 | 11/2010 | Sawachi |
| D631,835 S | 2/2011 | Neidhart |
| D635,445 S | 4/2011 | Foresman |
| D635,607 S | 4/2011 | Takagi |
| D637,552 S | 5/2011 | Inman |
| D640,196 S | 6/2011 | Shuang |
| D640,304 S | 6/2011 | Green |
| D641,389 S | 7/2011 | Dastagir |
| D642,517 S | 8/2011 | Inman |
| D643,809 S | 8/2011 | Okuda |
| D644,988 S | 9/2011 | Finney |
| D645,814 S | 9/2011 | Otani |
| 8,013,932 B2 | 9/2011 | Chan |
| 8,014,656 B2 | 9/2011 | Woodman |
| 8,026,945 B2 | 9/2011 | Garoutte |
| D646,222 S | 10/2011 | Tatehata |
| D646,313 S | 10/2011 | Woodman |
| D647,554 S | 10/2011 | Yim |
| 8,031,222 B2 | 10/2011 | Crinon |
| D647,935 S | 11/2011 | Raken |
| D647,944 S | 11/2011 | Jannard |
| D648,270 S | 11/2011 | Jiang |
| D654,850 S | 2/2012 | Obata |
| D654,853 S | 2/2012 | Bacon |
| D657,808 S | 4/2012 | Woodman |
| 8,150,248 B1 | 4/2012 | Woodman |
| D660,339 S | 5/2012 | Yoshida |
| D660,788 S | 5/2012 | Ziring |
| 8,194,145 B2 | 6/2012 | Lee |
| 8,194,174 B2 | 6/2012 | Roskowski |
| 8,199,251 B2 | 6/2012 | Woodman |
| 8,218,025 B2 | 7/2012 | Yonaha |
| D664,995 S | 8/2012 | Akana |
| D665,340 S | 8/2012 | Obata |
| 8,235,635 B1 | 8/2012 | Brown |
| 8,247,106 B2 | 8/2012 | Takeshita |
| D667,003 S | 9/2012 | Richter |
| 8,267,361 B1 | 9/2012 | Dordick |
| D668,247 S | 10/2012 | Kim |
| 8,300,107 B2 | 10/2012 | Strandwitz |
| D671,394 S | 11/2012 | Derry |
| 8,325,270 B2 | 12/2012 | Woodman |
| 8,328,055 B1 | 12/2012 | Snyder |
| D674,749 S | 1/2013 | Moore |
| D675,242 S | 1/2013 | O'Donnell |
| 8,348,214 B2 | 1/2013 | Vogt |
| 8,356,948 B2 | 1/2013 | Onishi |
| D676,476 S | 2/2013 | Ishikura |
| 8,368,748 B2 | 2/2013 | Ho |
| 8,371,729 B2 | 2/2013 | Sharrah |
| D679,576 S | 4/2013 | Paul |
| D680,097 S | 4/2013 | Davies |
| D681,550 S | 5/2013 | Corbin |
| D682,777 S | 5/2013 | Gupta |
| D682,778 S | 5/2013 | Baumgartner |
| D683,207 S | 5/2013 | Papadopoulos |
| 8,467,675 B2 | 6/2013 | Chen |
| 8,485,910 B2 | 7/2013 | Selle |
| D687,426 S | 8/2013 | Requa |
| D690,280 S | 9/2013 | Schul |
| 8,542,308 B2 | 9/2013 | Ozawa |
| D692,042 S | 10/2013 | Dawes |
| 8,544,643 B2 | 10/2013 | Yim |
| D692,939 S | 11/2013 | Huang |
| 8,638,392 B2 | 1/2014 | Woodman |
| D699,276 S | 2/2014 | Samuels |
| D699,277 S | 2/2014 | Samuels |
| D699,672 S | 2/2014 | Kosugi |
| D700,136 S | 2/2014 | Morris |
| D700,166 S | 2/2014 | Petersen |
| D701,840 S | 4/2014 | Kazakia |
| D702,276 S | 4/2014 | Woodman |

(56) References Cited

U.S. PATENT DOCUMENTS

| | | |
|---|---|---|
| D702,278 S | 4/2014 | Kim |
| 8,727,642 B1 | 5/2014 | Tse |
| 8,743,277 B2 | 6/2014 | Matsuzawa |
| 8,749,966 B1 | 6/2014 | Boudreau |
| D708,189 S | 7/2014 | An |
| D708,571 S | 7/2014 | Ji |
| D709,439 S | 7/2014 | Ferber |
| 8,792,003 B2 | 7/2014 | Nakamura |
| D710,921 S | 8/2014 | Gioscia |
| D710,922 S | 8/2014 | Gioscia |
| 8,807,849 B2 | 8/2014 | Apter |
| D712,347 S | 9/2014 | Awiszus |
| D712,391 S | 9/2014 | Kim |
| D713,868 S | 9/2014 | Yang |
| 8,825,124 B1 | 9/2014 | Davies |
| 8,827,219 B2 | 9/2014 | Kessler |
| 8,828,601 B2 | 9/2014 | Hara |
| 8,830,326 B2 | 9/2014 | Kitagawa |
| 8,837,928 B1 | 9/2014 | Clearman |
| D715,347 S | 10/2014 | Troxel |
| D715,789 S | 10/2014 | Yoon |
| 8,865,339 B2 | 10/2014 | Enari |
| 8,870,475 B1 | 10/2014 | Bennett |
| D718,617 S | 12/2014 | Taylor |
| 8,917,496 B2 | 12/2014 | Richardson |
| D721,395 S | 1/2015 | Woodman |
| D722,043 S | 2/2015 | Requa |
| D722,864 S | 2/2015 | Greenthal |
| D723,456 S | 3/2015 | Currah |
| D724,013 S | 3/2015 | Zsolcsak |
| D724,538 S | 3/2015 | Baumgartner |
| D724,637 S | 3/2015 | Samuels |
| D724,638 S | 3/2015 | Samuels |
| D725,169 S | 3/2015 | Gioscia |
| D725,590 S | 3/2015 | Clyne |
| D725,691 S | 3/2015 | De Rosa |
| 8,970,689 B2 | 3/2015 | Campbell |
| 8,992,102 B1 | 3/2015 | Samuels |
| D726,648 S | 4/2015 | Zealer |
| D727,387 S | 4/2015 | Hasegawa |
| D727,991 S | 4/2015 | Hasegawa |
| 9,004,783 B1 | 4/2015 | Woodman |
| 9,014,766 B2 | 4/2015 | Hu |
| D729,059 S | 5/2015 | Taylor |
| D729,761 S | 5/2015 | Hu |
| D729,762 S | 5/2015 | Hu |
| D730,287 S | 5/2015 | Motoyama |
| D730,423 S | 5/2015 | Vandenbussche |
| 9,033,596 B2 | 5/2015 | Samuels |
| D732,593 S | 6/2015 | Woodman |
| D732,933 S | 6/2015 | Jansen |
| D733,781 S | 7/2015 | Chen |
| D733,788 S | 7/2015 | Baker |
| D734,799 S | 7/2015 | Woodman |
| 9,077,013 B2 | 7/2015 | Huang |
| 9,097,962 B2 | 8/2015 | Johnson, Sr. |
| D737,879 S | 9/2015 | Woodman |
| D739,451 S | 9/2015 | Gioscia |
| 9,122,133 B2 | 9/2015 | Bennett |
| D740,868 S | 10/2015 | Gioscia |
| D741,394 S | 10/2015 | Gioscia |
| D741,932 S | 10/2015 | Huang |
| 9,152,019 B2 | 10/2015 | Kintner |
| 9,161,110 B1 | 10/2015 | Patsis |
| D742,818 S | 11/2015 | Lin |
| D742,952 S | 11/2015 | Nakajima |
| D744,572 S | 12/2015 | Tabuchi |
| D745,589 S | 12/2015 | Lee |
| D745,920 S | 12/2015 | Lee |
| 9,204,021 B2 | 12/2015 | Woodman |
| 9,204,022 B2 | 12/2015 | Campbell |
| 9,204,710 B1 | 12/2015 | Burns |
| 9,229,299 B1 | 1/2016 | Morlon |
| 9,243,737 B2 | 1/2016 | Hida |
| 9,243,739 B2 | 1/2016 | Peters |
| 9,244,337 B2 | 1/2016 | Weihe |
| D749,164 S | 2/2016 | Raccah |
| D750,146 S | 2/2016 | Costa |
| 9,268,200 B2 | 2/2016 | Clearman |
| 9,268,201 B1 | 2/2016 | Montgomery |
| D750,680 S | 3/2016 | Chen |
| D750,686 S | 3/2016 | Chen |
| D750,687 S | 3/2016 | Samuels |
| D750,690 S | 3/2016 | Lee |
| D751,131 S | 3/2016 | Woodman |
| D752,672 S | 3/2016 | Clearman |
| 9,282,226 B2 | 3/2016 | Samuels |
| 9,297,616 B2 | 3/2016 | Daniel |
| 9,297,640 B2 | 3/2016 | Tassakos |
| 9,300,345 B2 | 3/2016 | Johnson |
| D753,749 S | 4/2016 | Zhu |
| D754,238 S | 4/2016 | Woodman |
| D754,769 S | 4/2016 | Patulski |
| D755,270 S | 5/2016 | Vehlewald |
| D755,271 S | 5/2016 | Patulski |
| D755,274 S | 5/2016 | Lee |
| D755,874 S | 5/2016 | Yang |
| 9,357,115 B2 | 5/2016 | Campbell |
| D758,467 S | 6/2016 | Zhang |
| D759,145 S | 6/2016 | Lee |
| D759,585 S | 6/2016 | Herbst |
| D760,309 S | 6/2016 | Parfitt |
| D760,312 S | 6/2016 | Lee |
| 9,360,742 B1 | 6/2016 | Harrison |
| 9,372,383 B2 | 6/2016 | Johnson |
| 9,377,672 B1 | 6/2016 | Clearman |
| 9,395,031 B1 | 7/2016 | Clearman |
| 9,395,603 B2 | 7/2016 | Achenbach |
| D762,536 S | 8/2016 | Wurzer |
| D762,759 S | 8/2016 | Wu |
| D763,346 S | 8/2016 | Jenkins |
| D763,941 S | 8/2016 | Smith |
| D764,559 S | 8/2016 | Luo |
| D764,566 S | 8/2016 | Bennett |
| D764,567 S | 8/2016 | Bennett |
| 9,423,673 B2 | 8/2016 | Clearman |
| 9,426,341 B1 | 8/2016 | Baldrige |
| D765,594 S | 9/2016 | Li |
| D766,175 S | 9/2016 | Tsiopanos |
| D766,351 S | 9/2016 | Li |
| D769,346 S | 10/2016 | Nguyen |
| D769,814 S | 10/2016 | Lin |
| D772,804 S | 11/2016 | Nakashima |
| D772,966 S | 11/2016 | Song |
| 9,507,245 B1 | 11/2016 | Druker |
| D773,546 S | 12/2016 | Nguyen |
| D773,547 S | 12/2016 | Lee |
| D775,254 S | 12/2016 | Parfitt |
| 9,513,535 B2 | 12/2016 | Bennett |
| 9,521,302 B2 | 12/2016 | Samuels |
| 9,521,398 B1 * | 12/2016 | Woodman ............ H04N 13/239 |
| D776,183 S | 1/2017 | Miyazaki |
| D776,610 S | 1/2017 | Nommensen |
| D776,612 S | 1/2017 | Chen |
| D776,738 S | 1/2017 | Clearman |
| D776,741 S | 1/2017 | Parfitt |
| D776,746 S | 1/2017 | Bennett |
| D777,125 S | 1/2017 | Eder |
| D777,236 S | 1/2017 | Mai |
| D777,240 S | 1/2017 | Costa |
| D777,821 S | 1/2017 | Gioscia |
| 9,551,915 B2 | 1/2017 | Clearman |
| D778,335 S | 2/2017 | Gioscia |
| D778,336 S | 2/2017 | Gioscia |
| D779,576 S | 2/2017 | Ikegame |
| D780,111 S | 2/2017 | Clyne |
| D780,112 S | 2/2017 | Lin |
| D780,244 S | 2/2017 | Wang |
| D780,249 S | 2/2017 | Ramsthaler |
| 9,588,407 B1 | 3/2017 | Harrison |
| 9,596,388 B2 | 3/2017 | Woodman |
| 9,622,556 B2 | 4/2017 | Fathollahi |
| 9,625,791 B2 | 4/2017 | Harrison |
| 9,628,681 B2 | 4/2017 | Clearman |

(56) References Cited

U.S. PATENT DOCUMENTS

| | | |
|---|---|---|
| 9,635,226 B2 | 4/2017 | Samuels |
| D785,692 S | 5/2017 | Wang |
| D785,695 S | 5/2017 | Woodman |
| D785,696 S | 5/2017 | Parfitt |
| D785,697 S | 5/2017 | Costa |
| 9,661,197 B2 | 5/2017 | Clearman |
| D788,835 S | 6/2017 | Wu |
| D789,435 S | 6/2017 | Nguyen |
| D790,001 S | 6/2017 | Parfitt |
| D790,002 S | 6/2017 | Nguyen |
| D790,454 S | 6/2017 | Lee |
| 9,681,029 B2 | 6/2017 | Harrison |
| D791,211 S | 7/2017 | Fujita |
| D791,695 S | 7/2017 | Bergman |
| D791,848 S | 7/2017 | Zhu |
| D792,919 S | 7/2017 | Ryu |
| 9,699,360 B2 | 7/2017 | Woodman |
| D793,463 S | 8/2017 | Houin |
| D794,554 S | 8/2017 | Chang |
| D794,695 S | 8/2017 | Zhang |
| D794,696 S | 8/2017 | Nguyen |
| D795,061 S | 8/2017 | Bacallao |
| 9,736,376 B1 | 8/2017 | Holway |
| D797,040 S | 9/2017 | Lavin, Jr. |
| 9,763,548 B2 | 9/2017 | Theising |
| 9,772,542 B2 | 9/2017 | Clearman |
| D798,929 S | 10/2017 | Zhou |
| D799,953 S | 10/2017 | Papafagos |
| D800,202 S | 10/2017 | Hu |
| D800,205 S | 10/2017 | Harrison |
| D800,817 S | 10/2017 | Sutton |
| D800,819 S | 10/2017 | Parfitt |
| D800,822 S | 10/2017 | Costa |
| D803,705 S | 11/2017 | Read |
| D803,919 S | 11/2017 | Jeong |
| D803,920 S | 11/2017 | Shin |
| D803,925 S | 11/2017 | Hoshi |
| 9,823,549 B1 | 11/2017 | Miyashita |
| 9,829,772 B2 | 11/2017 | Harrison |
| D804,560 S | 12/2017 | Costa |
| D805,117 S | 12/2017 | Nguyen |
| D805,569 S | 12/2017 | Daugela |
| D806,155 S | 12/2017 | Parfitt |
| 9,851,622 B2 | 12/2017 | Song |
| D806,775 S | 1/2018 | Nguyen |
| D808,163 S | 1/2018 | Song |
| D808,898 S | 1/2018 | Walker |
| 9,864,257 B1 | 1/2018 | Wroblewski |
| 9,880,451 B2 | 1/2018 | Clearman |
| D811,335 S | 2/2018 | Weng |
| 9,904,148 B1 | 2/2018 | Druker |
| 9,915,855 B1 | 3/2018 | Miyashita |
| 9,926,029 B2 | 3/2018 | Rucker |
| 9,930,231 B2 | 3/2018 | Clearman |
| D814,543 S | 4/2018 | Oshima |
| D815,032 S | 4/2018 | Lin |
| D815,677 S | 4/2018 | Gao |
| D816,753 S | 5/2018 | Zhang |
| D818,025 S | 5/2018 | Wong |
| D818,028 S | 5/2018 | Ramones |
| D818,029 S | 5/2018 | Fujita |
| D818,517 S | 5/2018 | Szarawarski |
| D819,718 S | 6/2018 | Wu |
| D820,335 S | 6/2018 | Favè |
| D820,339 S | 6/2018 | Yau |
| D820,898 S | 6/2018 | Fujita |
| D821,476 S | 6/2018 | Martin |
| D821,480 S | 6/2018 | Gioscia |
| D821,481 S | 6/2018 | Gioscia |
| 10,025,166 B2 | 7/2018 | Clearman |
| D824,982 S | 8/2018 | Lee |
| D825,636 S | 8/2018 | Hueber |
| D829,260 S | 9/2018 | Fujita |
| D830,446 S | 10/2018 | Muhlenkamp, IV |
| 10,094,513 B2 | 10/2018 | Bennett |
| D832,905 S | 11/2018 | Liu |
| D832,906 S | 11/2018 | Hasegawa |
| D833,505 S | 11/2018 | Hu |
| D835,172 S | 12/2018 | Fujita |
| D835,574 S | 12/2018 | Trongone |
| D835,910 S | 12/2018 | Eliyahu |
| D836,696 S | 12/2018 | Zhang |
| D837,623 S | 1/2019 | Powers |
| D837,861 S | 1/2019 | Luo |
| D837,865 S | 1/2019 | Parfitt |
| D838,762 S | 1/2019 | Piekarski |
| D839,335 S | 1/2019 | Zhang |
| D839,945 S | 2/2019 | Lenz |
| D839,946 S | 2/2019 | De Vries |
| D840,463 S | 2/2019 | Nguyen |
| D840,795 S | 2/2019 | Tribbett |
| D841,721 S | 2/2019 | Muhlenkamp, IV |
| D842,142 S | 3/2019 | Recker |
| D847,609 S | 5/2019 | Ng |
| D848,509 S | 5/2019 | Lee |
| D849,076 S | 5/2019 | Bertram |
| D849,078 S | 5/2019 | Girotti |
| D849,084 S | 5/2019 | Hu |
| D849,100 S | 5/2019 | Hsu |
| D849,108 S | 5/2019 | Huang |
| D849,730 S | 5/2019 | Charette |
| 10,306,115 B2 | 5/2019 | Samuels |
| D850,513 S | 6/2019 | Gan |
| D851,155 S | 6/2019 | Hu |
| D852,255 S | 6/2019 | Guo |
| D852,256 S | 6/2019 | Bai |
| D854,597 S | 7/2019 | Gao |
| 10,356,291 B2 | 7/2019 | Woodman |
| D855,675 S | 8/2019 | Luo |
| D857,076 S | 8/2019 | Gan |
| D859,498 S | 9/2019 | Lin |
| 10,416,538 B2 | 9/2019 | Clearman |
| D861,592 S | 10/2019 | Venugopal |
| D861,761 S | 10/2019 | Bergman |
| D861,765 S | 10/2019 | Muhlenkamp, IV |
| D861,766 S | 10/2019 | Lim |
| D863,404 S | 10/2019 | Karpenko |
| D864,275 S | 10/2019 | Huang |
| D865,843 S | 11/2019 | Hu |
| D865,844 S | 11/2019 | Jalala |
| D865,845 S | 11/2019 | Sakai |
| D867,420 S | 11/2019 | Zhang |
| D867,427 S | 11/2019 | Bai |
| D868,871 S | 12/2019 | Nguyen |
| D868,874 S | 12/2019 | Muhlenkamp, IV |
| D869,844 S | 12/2019 | Eliyahu |
| D870,176 S | 12/2019 | Hokari |
| D870,183 S | 12/2019 | Tsukamoto |
| D871,480 S | 12/2019 | Hu |
| 10,511,750 B2 | 12/2019 | Clearman |
| 10,523,925 B2 | 12/2019 | Woodman |
| D872,156 S | 1/2020 | Zhao |
| D872,162 S | 1/2020 | Gao |
| D873,833 S | 1/2020 | Leimer |
| 10,536,615 B2 | 1/2020 | Campbell |
| 10,539,858 B2 | 1/2020 | Clearman |
| 10,547,769 B2 | 1/2020 | Harrison |
| D874,248 S | 2/2020 | Stekr |
| D876,521 S | 2/2020 | Costa |
| 10,574,871 B2 | 2/2020 | Abbas |
| D879,762 S | 3/2020 | Luo |
| D880,561 S | 4/2020 | Muhlenkamp |
| D880,567 S | 4/2020 | Zhang |
| D880,569 S | 4/2020 | Zhang |
| D881,974 S | 4/2020 | Nguyen |
| D882,666 S | 4/2020 | Tsukamoto |
| 10,631,621 B2 * | 4/2020 | Gregory ............... F16M 11/041 |
| D884,597 S | 5/2020 | Pilliod |
| D887,970 S | 6/2020 | Himeno |
| D890,709 S | 7/2020 | Lim |
| D890,835 S | 7/2020 | Nguyen |
| D892,194 S | 8/2020 | Nguyen |
| D892,905 S | 8/2020 | Nguyen |
| D893,578 S | 8/2020 | Denby |

(56) References Cited

U.S. PATENT DOCUMENTS

| | | |
|---|---|---|
| D894,256 S | 8/2020 | Vitale |
| D897,400 S | 9/2020 | Liu |
| D897,403 S | 9/2020 | Liu |
| D897,408 S | 9/2020 | Tsukamoto |
| 10,768,508 B1 | 9/2020 | Woodman |
| D900,911 S | 11/2020 | Muhlenkamp, IV |
| D903,740 S | 12/2020 | Au |
| D905,786 S | 12/2020 | Vitale |
| D906,396 S | 12/2020 | Schaarschmidt |
| D907,101 S | 1/2021 | Coster |
| D907,680 S | 1/2021 | Nguyen |
| D907,682 S | 1/2021 | Sjögren |
| D911,412 S | 2/2021 | Alberstein |
| D911,418 S | 2/2021 | Yap |
| 10,928,711 B2 * | 2/2021 | Vitale .................... F16M 13/04 |
| D912,120 S | 3/2021 | Druker |
| D920,419 S | 5/2021 | Muhlenkamp, IV |
| D921,086 S | 6/2021 | Li |
| D921,737 S | 6/2021 | Liang |
| D921,740 S | 6/2021 | Coster |
| D923,075 S | 6/2021 | Grant |
| D925,643 S | 7/2021 | Hsu |
| D926,243 S | 7/2021 | Tsukamoto |
| D928,863 S | 8/2021 | Alberstein |
| D934,943 S | 11/2021 | Zhao |
| D935,507 S | 11/2021 | Li |
| D939,608 S | 12/2021 | Han |
| D939,610 S | 12/2021 | Han |
| D940,066 S | 1/2022 | Venugopal |
| D941,904 S | 1/2022 | Coster |
| D942,373 S | 2/2022 | Ruffing |
| D943,654 S | 2/2022 | Jiang |
| D946,074 S | 3/2022 | Muhlenkamp |
| D947,357 S | 3/2022 | Chen |
| D947,920 S | 4/2022 | Muhlenkamp |
| D949,222 S | 4/2022 | Bergman |
| D950,624 S | 5/2022 | Muhlenkamp |
| D950,628 S | 5/2022 | Au |
| D950,629 S | 5/2022 | Muhlenkamp |
| D956,123 S | 6/2022 | Muhlenkamp |
| D963,017 S | 9/2022 | Muhlenkamp |
| D963,726 S | 9/2022 | Au |
| D980,302 S | 3/2023 | Han |
| 2001/0017339 A1 | 8/2001 | Brotz |
| 2001/0034163 A1 | 10/2001 | Chiang |
| 2001/0043281 A1 | 11/2001 | Onuki |
| 2002/0005907 A1 | 1/2002 | Alten |
| 2002/0046218 A1 | 4/2002 | Gilbert |
| 2002/0090212 A1 | 7/2002 | Shimamura |
| 2002/0101534 A1 | 8/2002 | Liu |
| 2002/0136557 A1 | 9/2002 | Shimamura |
| 2002/0178116 A1 | 11/2002 | Yamasaki |
| 2003/0035052 A1 | 2/2003 | Baron |
| 2003/0085244 A1 | 5/2003 | Parsons |
| 2003/0104806 A1 | 6/2003 | Ruef |
| 2003/0115662 A1 | 6/2003 | Dobbie |
| 2003/0156212 A1 | 8/2003 | Kingetsu |
| 2003/0179306 A1 | 9/2003 | Lee |
| 2004/0066457 A1 | 4/2004 | Silverstein |
| 2004/0076415 A1 | 4/2004 | Da |
| 2004/0095506 A1 | 5/2004 | Scott |
| 2004/0201745 A1 | 10/2004 | Wess |
| 2004/0212687 A1 | 10/2004 | Patwari |
| 2004/0223752 A1 | 11/2004 | Ghanouni |
| 2005/0019029 A1 | 1/2005 | Kawakami |
| 2005/0025472 A1 | 2/2005 | Sugita |
| 2005/0041966 A1 | 2/2005 | Johnson |
| 2005/0122424 A1 | 6/2005 | Overstreet |
| 2005/0190263 A1 | 9/2005 | Monroe |
| 2005/0208345 A1 | 9/2005 | Yoon |
| 2005/0212959 A1 | 9/2005 | Manabe |
| 2005/0265711 A1 | 12/2005 | Heibel |
| 2006/0007551 A1 | 1/2006 | Sakurai |
| 2006/0015664 A1 | 1/2006 | Zhang |
| 2006/0022108 A1 | 2/2006 | Kuga |
| 2006/0061663 A1 | 3/2006 | Park |
| 2006/0066753 A1 | 3/2006 | Gennetten |
| 2006/0072020 A1 | 4/2006 | McCutchen |
| 2006/0098966 A1 | 5/2006 | Takahashi |
| 2006/0139459 A1 | 6/2006 | Zhong |
| 2006/0177215 A1 | 8/2006 | Johnson |
| 2006/0233545 A1 | 10/2006 | Senba |
| 2006/0257137 A1 | 11/2006 | Fromm |
| 2006/0262365 A1 | 11/2006 | Imao |
| 2006/0274157 A1 | 12/2006 | Levien |
| 2006/0274493 A1 | 12/2006 | Richardson |
| 2007/0019948 A1 | 1/2007 | Terada |
| 2007/0024734 A1 | 2/2007 | Headley |
| 2007/0025711 A1 | 2/2007 | Marcus |
| 2007/0053680 A1 | 3/2007 | Fromm |
| 2007/0071423 A1 | 3/2007 | Fantone |
| 2007/0077062 A1 | 4/2007 | Senba |
| 2007/0109417 A1 | 5/2007 | Hyttfors |
| 2007/0126883 A1 | 6/2007 | Ishige |
| 2007/0140686 A1 | 6/2007 | Misawa |
| 2007/0154254 A1 | 7/2007 | Bevirt |
| 2007/0242134 A1 | 10/2007 | Zernov |
| 2007/0244634 A1 | 10/2007 | Koch |
| 2007/0268382 A1 | 11/2007 | Shiomi |
| 2007/0268588 A1 | 11/2007 | Elias |
| 2008/0011344 A1 | 1/2008 | Barker |
| 2008/0023607 A1 | 1/2008 | Barker |
| 2008/0063392 A1 | 3/2008 | Ahn |
| 2008/0072163 A1 | 3/2008 | Teng |
| 2008/0074487 A1 | 3/2008 | Ryckman |
| 2008/0100712 A1 | 5/2008 | Hayes |
| 2008/0107414 A1 | 5/2008 | Showalter |
| 2008/0117328 A1 | 5/2008 | Daoud |
| 2008/0122958 A1 | 5/2008 | Huseth |
| 2008/0180537 A1 | 7/2008 | Weinberg |
| 2008/0237414 A1 | 10/2008 | Lien |
| 2008/0248703 A1 | 10/2008 | Russell |
| 2008/0266389 A1 | 10/2008 | Dewind |
| 2008/0267613 A1 | 10/2008 | Darrow |
| 2008/0316327 A1 | 12/2008 | Steinberg |
| 2008/0316734 A1 | 12/2008 | Spartano |
| 2009/0003821 A1 | 1/2009 | Son |
| 2009/0032420 A1 | 2/2009 | Zenzai |
| 2009/0059064 A1 | 3/2009 | Terakado |
| 2009/0109286 A1 | 4/2009 | Ennis |
| 2009/0110380 A1 | 4/2009 | Fantone |
| 2009/0111543 A1 | 4/2009 | Tai |
| 2009/0173863 A1 | 7/2009 | Crown |
| 2009/0206077 A1 | 8/2009 | Melmon |
| 2009/0283184 A1 | 11/2009 | Han |
| 2009/0321483 A1 | 12/2009 | Froloff |
| 2010/0060747 A1 | 3/2010 | Woodman |
| 2010/0061711 A1 | 3/2010 | Woodman |
| 2010/0079607 A1 | 4/2010 | Won |
| 2010/0118158 A1 | 5/2010 | Boland |
| 2010/0141762 A1 | 6/2010 | Siann |
| 2010/0205537 A1 | 8/2010 | Knighton |
| 2010/0220188 A1 | 9/2010 | Renkis |
| 2010/0229450 A1 | 9/2010 | Becker |
| 2010/0246669 A1 | 9/2010 | Harel |
| 2010/0252188 A1 | 10/2010 | Inanami |
| 2010/0253832 A1 | 10/2010 | Duparre |
| 2010/0266273 A1 | 10/2010 | Wood |
| 2010/0283843 A1 | 11/2010 | Cai |
| 2010/0289904 A1 | 11/2010 | Zhang |
| 2010/0299814 A1 | 12/2010 | Celona |
| 2010/0333155 A1 | 12/2010 | Royall |
| 2011/0001834 A1 | 1/2011 | Herrell |
| 2011/0042530 A1 | 2/2011 | Phillips |
| 2011/0064401 A1 | 3/2011 | Desorbo |
| 2011/0129210 A1 | 6/2011 | McGucken |
| 2011/0138673 A1 | 6/2011 | Deros |
| 2011/0147245 A1 | 6/2011 | Yim |
| 2011/0211820 A1 | 9/2011 | Yim |
| 2011/0216195 A1 | 9/2011 | Tanaka |
| 2011/0223447 A1 | 9/2011 | Ignor |
| 2011/0224798 A1 | 9/2011 | Caillouette |
| 2011/0252188 A1 | 10/2011 | Weingarten |
| 2011/0260022 A1 | 10/2011 | Lin |

(56) References Cited

U.S. PATENT DOCUMENTS

| | | |
|---|---|---|
| 2011/0297578 A1 | 12/2011 | Stiehl |
| 2011/0298970 A1 | 12/2011 | Shinohara |
| 2011/0317065 A1 | 12/2011 | Lin |
| 2012/0017922 A1 | 1/2012 | Hirshberg |
| 2012/0043236 A1 | 2/2012 | Szucs |
| 2012/0070223 A1 | 3/2012 | Wimberley |
| 2012/0099849 A1 | 4/2012 | Onishi |
| 2012/0120236 A1 | 5/2012 | Xiao |
| 2012/0133758 A1 | 5/2012 | Foss |
| 2012/0195585 A1 | 8/2012 | Wagner |
| 2012/0224078 A1 | 9/2012 | Woodman |
| 2012/0228346 A1 | 9/2012 | Huang |
| 2012/0240444 A1 | 9/2012 | Russell |
| 2012/0242785 A1 | 9/2012 | Sasagawa |
| 2012/0242786 A1 | 9/2012 | Sasagawa |
| 2012/0262618 A1 | 10/2012 | Weakly |
| 2012/0288269 A1 | 11/2012 | Jensen |
| 2012/0312309 A1 | 12/2012 | Zimmerman |
| 2012/0315813 A1 | 12/2012 | Rossini |
| 2012/0324682 A1 | 12/2012 | Ballentine |
| 2013/0029515 A1 | 1/2013 | Lin |
| 2013/0057758 A1 | 3/2013 | Woodman |
| 2013/0082963 A1 | 4/2013 | Chu |
| 2013/0107111 A1 | 5/2013 | Campbell |
| 2013/0127309 A1 | 5/2013 | Wyner |
| 2013/0148951 A1 | 6/2013 | Zhang |
| 2013/0170823 A1 | 7/2013 | McDonald |
| 2013/0184033 A1 | 7/2013 | Willenborg |
| 2013/0186310 A1 | 7/2013 | Lymberis |
| 2013/0200768 A1 | 8/2013 | Miura |
| 2013/0250134 A1 | 9/2013 | McCauley |
| 2013/0263865 A1 | 10/2013 | Khast |
| 2013/0306689 A1 | 11/2013 | Johnson |
| 2013/0315577 A1 | 11/2013 | Clark |
| 2013/0321696 A1 | 12/2013 | Bae |
| 2013/0324189 A1 | 12/2013 | Katis |
| 2013/0331976 A1 | 12/2013 | Freeman |
| 2014/0016922 A1 | 1/2014 | Greenthal |
| 2014/0027591 A1 | 1/2014 | Fountain |
| 2014/0028484 A1 | 1/2014 | Ho |
| 2014/0036420 A1 | 2/2014 | Chen |
| 2014/0050468 A1 | 2/2014 | Henry |
| 2014/0060582 A1 | 3/2014 | Hartranft |
| 2014/0066144 A1 | 3/2014 | Hong |
| 2014/0069824 A1 | 3/2014 | Kalashnikov |
| 2014/0098241 A1 | 4/2014 | Stout |
| 2014/0099093 A1 | 4/2014 | Johnson |
| 2014/0104447 A1 | 4/2014 | Woodman |
| 2014/0105589 A1 | 4/2014 | Samuels |
| 2014/0160349 A1 | 6/2014 | Huang |
| 2014/0190841 A1 | 7/2014 | Nash |
| 2014/0226268 A1 | 8/2014 | Oneill |
| 2014/0231475 A1 | 8/2014 | Donnelly |
| 2014/0252188 A1 | 9/2014 | Webster |
| 2014/0267894 A1 | 9/2014 | Campbell |
| 2014/0321843 A1 | 10/2014 | Hulse |
| 2014/0353178 A1 | 12/2014 | Kim |
| 2015/0022717 A1 | 1/2015 | Coons |
| 2015/0030320 A1 | 1/2015 | Clearman |
| 2015/0040917 A1 | 2/2015 | Gottsch |
| 2015/0078737 A1 | 3/2015 | Albonico |
| 2015/0122849 A1 | 5/2015 | Jones |
| 2015/0130998 A1 | 5/2015 | Campbell |
| 2015/0136620 A1 | 5/2015 | Williams |
| 2015/0143618 A1 | 5/2015 | Pereira |
| 2015/0171404 A1 | 6/2015 | Kwon |
| 2015/0177597 A1 | 6/2015 | Harrison |
| 2015/0180527 A1 | 6/2015 | Fathollahi |
| 2015/0189131 A1 | 7/2015 | Woodman |
| 2015/0192841 A1 | 7/2015 | Bennett |
| 2015/0195436 A1 | 7/2015 | Samuels |
| 2015/0201113 A1 | 7/2015 | Wood |
| 2015/0234258 A1 | 8/2015 | Hida |
| 2015/0253651 A1 | 9/2015 | Russell |
| 2015/0264226 A1 | 9/2015 | Gafni |
| 2015/0286115 A1 | 10/2015 | Koch |
| 2015/0286117 A1 | 10/2015 | Sung |
| 2015/0288892 A1 | 10/2015 | Frank |
| 2015/0305518 A1 | 10/2015 | Galant |
| 2015/0312446 A1 | 10/2015 | Blackman |
| 2015/0316835 A1 | 11/2015 | Scott |
| 2015/0318579 A1 | 11/2015 | Kwon |
| 2015/0323856 A1 | 11/2015 | Nordhaug |
| 2015/0332129 A1 | 11/2015 | Murphy |
| 2015/0346588 A1 | 12/2015 | Hudson |
| 2015/0366093 A1 | 12/2015 | Battista |
| 2016/0077409 A1 | 3/2016 | Samuels |
| 2016/0100083 A1 | 4/2016 | Harrison |
| 2016/0116828 A1 | 4/2016 | Clearman |
| 2016/0119516 A1 | 4/2016 | Clearman |
| 2016/0131963 A1 | 5/2016 | Clearman |
| 2016/0131964 A1 | 5/2016 | Basulto |
| 2016/0134788 A1 | 5/2016 | Clearman |
| 2016/0139494 A1 | 5/2016 | Tien |
| 2016/0186919 A1 | 6/2016 | Zhao |
| 2016/0209731 A1 | 7/2016 | Song |
| 2016/0209733 A1 | 7/2016 | Akai |
| 2016/0216597 A1 | 7/2016 | Lim |
| 2016/0219202 A1 | 7/2016 | Barros |
| 2016/0269629 A1 | 9/2016 | Martin |
| 2016/0274338 A1 | 9/2016 | Davies |
| 2016/0309064 A1 | 10/2016 | Woodman |
| 2016/0330352 A1 | 11/2016 | Samuels |
| 2016/0355121 A1 | 12/2016 | Gertsma |
| 2016/0373623 A1 | 12/2016 | Woodman |
| 2017/0050794 A1 | 2/2017 | Clark |
| 2017/0059967 A1 | 3/2017 | Harrison |
| 2017/0060184 A1 | 3/2017 | Ranetkins |
| 2017/0090273 A1 | 3/2017 | Clearman |
| 2017/0108759 A1 | 4/2017 | Clearman |
| 2017/0111559 A1 | 4/2017 | Abbas |
| 2017/0142300 A1 | 5/2017 | Rice |
| 2017/0150236 A1 | 5/2017 | Newman |
| 2017/0176843 A1 | 6/2017 | Yamakose |
| 2017/0195550 A1 | 7/2017 | Kim |
| 2017/0223238 A1 | 8/2017 | Clearman |
| 2017/0235213 A1 | 8/2017 | Clearman |
| 2017/0255082 A1 | 9/2017 | Song |
| 2017/0272626 A1 | 9/2017 | Harrison |
| 2017/0289413 A1 | 10/2017 | Samuels |
| 2017/0324890 A1 | 11/2017 | Moskovchenko |
| 2017/0339319 A1 | 11/2017 | Woodman |
| 2018/0039162 A1 | 2/2018 | Ali |
| 2018/0059514 A1 | 3/2018 | Druker |
| 2018/0081258 A1 | 3/2018 | Clyne |
| 2018/0084194 A1 | 3/2018 | Woodman |
| 2018/0084215 A1 | 3/2018 | Jing |
| 2018/0095343 A1 | 4/2018 | Wroblewski |
| 2018/0102123 A1 | 4/2018 | Tisch |
| 2018/0103189 A1 | 4/2018 | Nguyen |
| 2018/0103190 A1 | 4/2018 | Nguyen |
| 2018/0136546 A1 | 5/2018 | Clearman |
| 2018/0146122 A1 | 5/2018 | Campbell |
| 2018/0157153 A1 | 6/2018 | Clearman |
| 2018/0198989 A1 | 7/2018 | MacMillan |
| 2018/0220050 A1 | 8/2018 | Clearman |
| 2018/0262682 A1 | 9/2018 | Wang |
| 2019/0025675 A1 | 1/2019 | Druker |
| 2019/0179214 A1 | 6/2019 | Hara |
| 2019/0238729 A1 | 8/2019 | Samuels |
| 2019/0258142 A1 | 8/2019 | Liu |
| 2019/0281197 A1 | 9/2019 | Woodman |
| 2019/0342473 A1 | 11/2019 | Clearman |
| 2019/0342474 A1 | 11/2019 | Woodman |
| 2019/0369466 A1 | 12/2019 | Clearman |
| 2020/0159091 A1 | 5/2020 | Vitale |
| 2020/0184690 A1 | 6/2020 | Guérin |
| 2020/0204721 A1 | 6/2020 | Douady |
| 2020/0204772 A1 | 6/2020 | Gounelle |
| 2020/0218136 A1 | 7/2020 | Au |
| 2020/0221010 A1 | 7/2020 | Douady |
| 2020/0221219 A1 | 7/2020 | Hardin |

(56) References Cited

U.S. PATENT DOCUMENTS

| | | |
|---|---|---|
| 2020/0259978 A1 | 8/2020 | Abbas |
| 2021/0173288 A1 | 6/2021 | Vitale |

FOREIGN PATENT DOCUMENTS

| | | |
|---|---|---|
| CN | 1740899 A | 3/2006 |
| CN | 1892403 A | 1/2007 |
| CN | 101078859 A | 11/2007 |
| CN | 100432830 | 11/2008 |
| CN | 101331815 A | 12/2008 |
| CN | 102005552 A | 4/2011 |
| CN | 201796220 U | 4/2011 |
| CN | 202353622 U | 7/2012 |
| CN | 104871082 A | 8/2015 |
| CN | 105474089 | 4/2016 |
| CN | 106164768 | 11/2016 |
| CN | 106516141 A | 3/2017 |
| CN | 206579852 U | 10/2017 |
| CN | 207083334 U | 3/2018 |
| CN | 207531231 U | 6/2018 |
| CN | 109375454 | 2/2019 |
| CN | 110426910 | 11/2019 |
| DE | 202005004068 U1 | 6/2005 |
| DE | 202013005239 | 7/2013 |
| DE | 202014011346 | 8/2019 |
| EP | 0845399 A2 | 6/1998 |
| EP | 1653423 A1 | 5/2006 |
| EP | 2464096 A1 | 6/2012 |
| EP | 2906993 | 8/2015 |
| EP | 3025193 | 6/2016 |
| EP | 3092527 | 11/2016 |
| EP | 0031985220005 | 2/2018 |
| GB | 2018929 A | 10/1979 |
| GB | 2363028 A | 12/2001 |
| GB | 6006189 | 1/2017 |
| JP | H05304625 A | 11/1993 |
| JP | 2001217564 A | 8/2001 |
| JP | 2003142841 A | 5/2003 |
| JP | 2004080256 A | 3/2004 |
| JP | 2004221775 A | 8/2004 |
| JP | 2005142671 A | 6/2005 |
| JP | 2007057997 A | 3/2007 |
| JP | 2008109364 A | 5/2008 |
| JP | 2011193209 A | 9/2011 |
| JP | 1595273 | 1/2018 |
| JP | 1595299 | 1/2018 |
| JP | 2018107558 A | 7/2018 |
| WO | 2004023795 A1 | 3/2004 |
| WO | 2004081713 A2 | 9/2004 |
| WO | 2005096760 A2 | 10/2005 |
| WO | 2005098304 A1 | 10/2005 |
| WO | 2007128317 A1 | 11/2007 |
| WO | 2007130146 A1 | 11/2007 |
| WO | 2010005975 A1 | 1/2010 |
| WO | 2010005976 A1 | 1/2010 |
| WO | 2013067340 | 5/2013 |
| WO | 2014062360 A1 | 4/2014 |
| WO | 2015013054 A1 | 1/2015 |
| WO | 2015102888 A1 | 7/2015 |
| WO | 2016053472 | 4/2016 |
| WO | 2016064468 | 4/2016 |
| WO | 2016073188 | 5/2016 |

OTHER PUBLICATIONS

'GoPro Hero 3 Sports Wrist Camera Review,' PaddleDogNation, 2006, 6 pages, [Online] [Retrieved on Aug. 8, 2007] Retrieved from the Internet <URL:http://paddledognation.com/Reviews/PaddlingGearReviews/He-ro3Ca . . . >.

'Tekkno Trading Project—Brandnews,' NSP, Jan. 2008, p. 59.

"FlyHi Battery". Found online Nov. 2, 2021 at amazon.com. Reference dated Nov. 21, 2016. 3 pages. Retrieved from https://www.amazon.com/ dp/B01MTQ9D74?tag=toptenbest-20. (Year: 2016).

"GoPro Fusion". Found online Feb. 3, 2023 at amazon.com. Reference dated Feb. 1, 2018. Retrieved from https://www.amazon.com/ GoPro-Camera-ASBBA-001-Fusion-Battery/dp/B078XY2L42. (Year: 2018).

"GoPro Rechargeable Battery". Found online Mar. 10, 2022 at amazon.co.uk Reference dated Oct. 7, 2016. 4 pages. Retrieved from https:// www.amazon.co.uk/GoPro-Rechargeable-Battery-Official-Accessory-Black/dp/B01MOPV67H/?th=1.(Year: 2016).

"Newmowa Rechargeable Battery" Found online Mar. 14, 2022 at amazon.co.uk. Reference dated Mar. 26, 2017. 6 pages. Retrieved from https:// www.amazon.co.uk/Newmowa-Rechargeable-AHDBT-302-Replacement-3-Channel/dp/B06XW6R74Z. (Year: 2017).

"Tectra Battery". Found online Mar. 10, 2022 at joom.com. Reference dated Jun. 6, 2019. 3 pages. Retrieved from https://www.joom.com/en/ products/5c9356006ecda80101b7f260. (Year: 2019).

"Telesin Batteries". Found online Mar. 10, 2022 at amazon.com Reference dated Mar. 29, 2019. 3 pages. Retrieved from https:// www.amazon.com/TELESIN-Replacement-Batteries-Function-Waterproof/dp/B07Q4C1MST.(Year: 2019).

"WoCase 360 Degree Panoramic Swiveling Glove Mount Hand Mount (Compatible with left handed) for GoPro HERO4 HERO3+3 2 1 Cameras (Rotary Mount, Retail Package, Gifting Ready)," Amazon.com, Jul. 11, 2013, 8 pages, [online] [retrieved on Feb. 22, 2020] Retrieved from the internet <URL:http://www.amazon.com/WoCase-Panoramic-Swiveling-Compatible-Cameras/dp/B00HMLYMHW/ref=pd_sim_sbs_421_1?ie=UTF8&dpID=51%2BoLD9jb2L&dpSrc=sims&preST=_AC_UL160_SR160%2C160_&refRID=097XMG8E8BDXQAJRSS0D>.

Alex NLD AHDBT501 TinEye. Tineye.com [published Jan. 13, 2017][online][Accessed Feb. 28, 2017]<Url:https://tineye.com/search/a068519109ac11d29440a513c6a88863d1-dc6e51/?extension.sub.--ver=chrome-1.1.5>, 4 pages.

Amazon.com: Ailuki Rechargeable Battery 1490MAH 2 Pack and 3-Channel Charger for GoPro Hero. Published Jun. 22, 2017. Retrieved from the internet at <https://www.annazon.conn/Rechargeable-Battery-3-Channel-Compatible-Original/dp/B0734J76NN/>, Jan. 19, 2019. 1 page. (Year: 2017).

Canon, 'Wireless file Transmitter WFT-EF E,' 2009, 132 pages, [Online] [Retrieved on Feb. 11, 2015] Retrieved from the Internet<URL:http://shuttersnitch.com/downloads/manuals/canon/wft-e5-en.pdf.

CheesyCam.com, 'Remote LCD Live View + Remote Shutter for DSLR Video—Exciting!', Jul. 16, 2010, 12 pages, [Online] [Retrieved on Feb. 11, 2015] Retrieved from the Internet<URL:http://cheesycam.com/remote-lcd-live-view-for-dslr-video-exciting/>.

Chinese Office Action dated May 30, 2018 for CN Application No. 201480072371.9, (6 pages).

Chinese Office Action, Chinese Application No. 201430488714.2, Mar. 12, 2015, 3 pages.

Design U.S. Appl. No. 29/631,230, filed Feb. 28, 2017, Huy Phuong Nguyen et al., 82 pages.

Design U.S. Appl. No. 29/661,818, filed Aug. 31, 2018, Huy Phuong Nguyen et al., 79 pages.

Design U.S. Appl. No. 29/661,819, filed Aug. 31, 2018, Vitale et al., 80 pages.

Design U.S. Appl. No. 29/663,435, filed Sep. 14, 2018, Au et al., 68 pages.

Design U.S. Appl. No. 29/681,087, filed Feb. 22, 2019, Vitale et al., 41 pages.

Design U.S. Appl. No. 29/694,559, filed Jun. 11, 2019, Coster et al., 28 pages.

Design U.S. Appl. No. 29/699,945, filed Jul. 30, 2019, Huy Phuong Nguyen et al., 11 pages.

Design U.S. Appl. No. 29/706,013, filed Sep. 17, 2019, Muhlenkamp et al., 97 pages.

Double male GoPro bar by eliotg Thingiverse. [online] Published on Jan. 16, 2016. Retrieved from URL:https://www.thingiverse.com/thing: 1273246 (2 pages).

European Search Report for European Patent Application No. EP 14876907.8, Jan. 10, 2017, 8 Pages.

Fantaseal Action Camera Bike Mount Aluminum Alloy 2-Rail Saddle Bike Seat Mount for GoPro Pro Seat Rail Mount GoPro Bike Mount GoPro Bicycle Seat Rack Mount for GoPro Garmin Virb XE

(56) References Cited

OTHER PUBLICATIONS

SJCAM DBPOWER-BK. Online, published date unknown. Retrieved on May 23, 2018 from URL: https://www.amazon.com/fantaseal-Action-Camera-Bi (1 page).
File Inspection—DE 20 2013 005 239.2, (MAAS) Retrieved on Oct. 13, 2015 (Oct. 13, 2015) entire document, 4 Pages, [Online] retrieved from DPMAregister <URL:https://register.dpma.de/DPMAregister/pat/PatAkteneinsicht?akz=2020130052392>.
Guarnera, M. et al., 'Manet: Possible Applications with PDA in Wireless Imagining Environment', IEEE International Symposium, Sep. 2002, vol. 7, pp. 2394-2398, vol. 5, pp. 15-18.
http://web.archive.org/web/20190503083635/http://www.fvshare.com:80/en/viltag Note—wayback machine link may take extra time to load pictures May 3, 2019, 8 pages.
https://www.amazon.com/Adjust-Straight-Joints-HSU-Direction/dp/B01IQPD9DU/ref=sr_1_1?keywords=long+and+short+straight+joint+tripod+mount+adapter+for+GoPro+hero+5+4+3&qid=1582047554&sr=8-1, retrieved Feb. 22, 2020, 9 pages.
https://www.amazon.com/Fotasy-Aluminum-Folding-Release-Cameras/dp/B0058FJHR4/ref=sr_1_8?keywords=z+tripod+mount&qid=1582047698&sr=8-8, retrieved Feb. 22, 2020, 10 pages.
https://www.amazon.com/Tripod-Pistol-Cameras-Weighing-2-5lbs/dp/B0739YGN9M/ref=sr_1_1?keywords=Handheld+Grip+Mini+Tripod+Stand+for+DC+Digital+Camera+Camcorder&qid=1582047442&sr=8-1, Retrieved Feb. 22, 2020, 9 pages.
https://www.youtube.com/watch?v=sOfMcPM5Xg4 (@7:08 mark), retrieved Feb. 22, 2020. No pdf attached. please see video at link.
Huang, J., "Part 19—Oct. 21: Interbike Bits and Baubles," Interbike Show, Las Vegas, Nevada, USA, Sep. 22-26, 2008, Cyclingnews.com, [Online] [Retrieved on Oct. 21, 2008] Retrieved from the Internet<URL:http://www.cyclingnews.com/tech/2008/shows/interbike08/?i- d=result . . . >. 3 pages.
I Phone X Outfitting it for Adventure. [online] Published on Nov. 29, 2017. Retrieved from URL: https://explore.globalcreations.com/reviews/tools/outfitting-iphone-x-adventure/ (13 pages).
Instagram Account for "mygomount", First post uploaded on Mar. 19, 2017, 3 Pages, [online] Retrieved on Jul. 25, 2017] Retrieved from the internet <URL:https://www.instagmm.com/mygomount/?h1=en>.
International Preliminary Report on Patentability for App. No. PCT/US2019/045281, dated Feb. 18, 2021, 7 pages.
International Search Report and Written Opinion for App. No. PCT/CN2020/099915, dated Mar. 25, 2021, 10 pages.
International Search Report and Written Opinion for App. No. PCT/US2020/050479 dated Dec. 3, 2020, 6 pages.
International Search Report and Written Opinion for App. No. PCT/US2020/050483 dated Nov. 12, 2020, 9 pages.
International Search Report and Written Opinion for Application No. PCT/US2019/045281, date of mailing Oct. 24, 2019, 10 pages.
International Search Report and Written Opinion for International Application No. PCT/US2014/046552, Aug. 18, 2014, 7 pages.
Ion USA, 'Wi-Fi Podz,' Date Unknown, 2 pages. [Online] [Retrieved Oct. 11, 2016] Retrieved from the internet <https://usa.ioncamera.com/shop/wi-fi-podz/>.
JP-05304625 A, 1993, 5 pages, (Machine Translation available from JPO website), [Online]. [Retrieved Dec. 14, 2014], Retrieved from the Internet < http://dossier1.ipdl.inpit.go.jp/cgi-bin/tran_web_cgi_e-jje?u=http%3A%2F%2Fdossier1% . . . >.
JP5-304625 English Machine Translation available from JPO website. 2016. 7 pages.
Kingma Ebay. Ebay.com. [published Nov. 10, 2016][online][Accessed Feb. 28, 2017]<URL:http://www.ebay.com/itm/KingMa-AHDBT-501-Li-ion-Battery-1220- mAh-Dual-Charger-For-Gopro-Hero-5-Camera-/272413104511>, 4 pages.
Non-Final Rejection for U.S. Appl. No. 13/665,594 mailed Mar. 29, 2013, 25 Pages.
Non-Final Rejection for U.S. Appl. No. 12/498,890 mailed Aug. 30, 2011, 31 Pages.

Norouznezhad, E. et al. "A High Resolution Smart Camera with GigE Vision Extension for Surveillance Applications," Second ACM/IEEE International Conference on Distributed Smart Cameras, 2008, 8 pages.
United States Office Action, U.S. Appl. No. 29/576,880, Mar. 9, 2017, 13 pages.
Vilta-G-Freevision Intelligent Technology, URL:http://www.fvshare.com/en/viltag, retrieved on Feb. 22, 2020, 8 pages.
Vixen Polarie Star Tracker Review. [online] Published date Mar. 22, 2013. Retrieved on Oct. 25, 2016 from <URL: https://www.ephotozine.com/article/vixen-polarie-star-tracker-review-21516> 6 pages.
Volk, W., 'Go Pro's Digital Hero Camera,' Divester, Posted Dec. 5, 2008, [Online] [Retrieved on Sep. 16, 2009] Retrieved from the Internet<URL:http://www.divester.com/2006/12/05/go-pro-digital-hero-camera/>. 3 pages.
YourDealer, 'Aputure Gigtube Digital Screen Remote Viewfinder gives you more remote control with most DSLRs,' 2009 Deals-World.com, Apr. 11, 2010, 3 pages, [Online] [Retrieved on Feb. 11, 2015] Retrieved from the Internet <URL:http://www.deals-world.com/deals/2010/04/11/aputure-gigtube-digital-screen-remote-viewfinder-gives-you-more-remote-control-with-most-dslrs/, Apr. 11, 2010.
youtube.com, Video for 'The Air Pro Wi-Fi Podz,' Aug. 18, 2014, 1 page, [Online] [Retrieved Oct. 11, 2016] Can be retrieved from the internet <URL:https://www.youtube.com/watch?v=YpWZ44aCdGA>.
youtube.com, Video for 'The WiFi Podz Tutorial,' Jun. 15, 2012, 2 pages. [Online] [Retrieved Oct. 11, 2016] Can be retrieved from the internet <URL:https://www.youtube.com/watch?v=kGGwGobzQBg>.
youtube.com: Ailuki Battery Charger for GoPro Hero 5/6/7 at ~9 seconds; published by Jake Wipp on Mar. 15, 2019; retrieved from the internet at <<https://www.youtube.com/watch?v=M13sf6NBkVE>> on Apr. 24, 2019; 1 page.
Office Action for Taiwanese Patent Application No. TW 103304745, Jan. 28, 2016, 3 Pages.
Office Action for U.S. Appl. No. 14/521,458, Feb. 25, 2016, 13 Pages.
Office Action for U.S. Appl. No. 14/521,458, Jul. 28, 2015, 12 Pages.
PCT International Search Report and Written Opinion for PCT/US15/43958, Nov. 9, 2015, 14 Pages.
PCT International Search Report and Written Opinion for PCT/US15/45403, Nov. 19, 2015, 12 Pages.
PCT International Search Report and Written Opinion for PCT/US15/56478, Jan. 15, 2016, 9 Pages.
PCT International Search Report and Written Opinion for PCT/US2014/058465, Dec. 23, 2014, 17 pages.
PCT International Search Report and Written Opinion for PCT/US2014/070655, Apr. 29, 2015, 13 Pages.
PCT International Search Report and Written Opinion for PCT/US2015/028377, Jul. 24, 2015, 16 Pages.
PCT International Search Report and Written Opinion, PCT Application No. PCT/US2009/049821, Sep. 3, 2009, 8 pages.
PCT International Search Report and Written Opinion, PCT/US2012/063304, Jan. 22, 2013, 7 Pages.
PCT International Search Report for Written Opinion for PCT/US2013/062061, Mar. 3, 2014, 15 Pages.
Pro Camera Bracket Integrated Mount. Online, published date unknown. Retrieved on May 23, 2018 from URL: https://www.annaincycling.conn/pro-camera-bracket-integrated-mount-black-17-pro-saddle-connpatible-prac0129/p612468 (1 page).
Pro Standard, "The Grill Mount Multi-Function Mouth Mount," Date unknown, 8 Pages, [online] [Retrieved on Jul. 25, 2017] Retrieved from the internet <URL:https://www.prostandard.com/collections/pro-standard/products/the-grill-mount?variant=7683423299>.
Re-Fuel, '24hr Action Pack Battery for GoPro Hero4, Hero3+ & Hero3,' Date Unknown, 5 pages. [Online] [Retrieved Oct. 11, 2016] Retrieved from the internet <https://re-fuel.com/action-packs/24hr-action-battery-pack.html>.
Shopthewall Tin Eye. Tineye.com[published Feb. 9, 2017][online][Accessed Feb. 27, 2017]. <URL:https://tineye.com/search/2432380143a2cf364f8dd9e5150bce62a316525- f/?extension.sub.--ver=chrome-1.1.5>, 4 pages.

(56) References Cited

OTHER PUBLICATIONS

Spypoint Xcel Action Camera Adhesive Mount XHD-AM. Online, published date unknown. Retrieved on May 14, 2020 from URL: https://www.opticsplanet.com/spy-point-xcel-action-camera-adhesive-mount.html, 1 page.
Sun, X. et al. "Region of Interest Extraction and Virtual Camera Control Based on Panoramic Video Capturing," IEEE Transactions on Multimedia, 2005, pp. 981-990, vol. 7, issue 5.
Supplementary European Search Report for European Patent Application No. EP 14829354, Aug. 16, 2016, 6 Pages.
U.S. Appl. No. 16/697,947, filed Nov. 27, 2019, Vitale et al., 77 pages.
United States Advisory Action, U.S. Appl. No. 14/521,458, Aug. 12, 2016, 2 pages.
United States Advisory Action, U.S. Appl. No. 14/521,458, Jun. 20, 2016, 4 pages.
United States Advisory Action, U.S. Appl. No. 14/947,766, Aug. 29, 2016, 3 pages.
United States Office Action for U.S. Appl. No. 14/148,536, Jul. 9, 2014, 9 pages.
United States Office Action for U.S. Appl. No. 14/536,683, Dec. 18, 2014, 14 Pages.
United States Office Action for U.S. Appl. No. 14/536,683, Jun. 9, 2015, 16 pages.
United States Office Action for U.S. Appl. No. 14/536,683, Sep. 21, 2015. 15 Pages.
United States Office Action for U.S. Appl. No. 13/666,807, Oct. 6, 2014, 11 pages.
United States Office Action for U.S. Appl. No. 14/149,502, Jul. 9, 2014, 8 pages.
United States Office Action for U.S. Appl. No. 14/495,673, Jan. 28, 2015, 16 pages.
United States Office Action for U.S. Appl. No. 14/495,673, Mar. 24, 2015, 15 pages.
United States Office Action for U.S. Appl. No. 14/495,673, Nov. 7, 2014, 16 pages.
United States Office Action for U.S. Appl. No. 14/604,118, Apr. 14, 2015, 11 pages.
United States Office Action, U.S. Appl. No. 14/459,650, Jun. 10, 2015, 7 pages.
United States Office Action, U.S. Appl. No. 14/132,554, Apr. 24, 2015, 13 pages.
United States Office Action, U.S. Appl. No. 14/132,554, Dec. 3, 2015, 28 pages.
United States Office Action, U.S. Appl. No. 14/132,554, Feb. 26, 2016, 31 pages.
United States Office Action, U.S. Appl. No. 14/854,040, Feb. 4, 2016, 7 pages.
United States Office Action, U.S. Appl. No. 14/521,458, Feb. 25, 2016, 13 pages.
United States Office Action, U.S. Appl. No. 14/521,458, Jul. 28, 2015, 12 pages.
United States Office Action, U.S. Appl. No. 14/521,458, Sep. 20, 2016, 16 pages.
United States Office Action, U.S. Appl. No. 14/606,018, Dec. 2, 2016, 19 pages.
United States Office Action, U.S. Appl. No. 14/606,018, Jan. 13, 2016, 16 pages.
United States Office Action, U.S. Appl. No. 14/606,018, Jul. 15, 2016, 21 pages.
United States Office Action, U.S. Appl. No. 14/606,018, Jun. 2, 2016, 19 pages.
United States Office Action, U.S. Appl. No. 14/947,766, Apr. 21, 2016, 13 pages.
United States Office Action, U.S. Appl. No. 14/947,766, Aug. 16, 2016, 6 pages.
United States Office Action, U.S. Appl. No. 14/947,766, Nov. 9, 2016, 11 pages.
United States Office Action, U.S. Appl. No. 15/180,535, Jan. 17, 2017, 12 pages.
United States Office Action, U.S. Appl. No. 15/187,708, Oct. 7, 2016, 13 pages.

* cited by examiner

INTERCONNECT MECHANISM FOR IMAGE CAPTURE DEVICE

CROSS-REFERENCE TO RELATED APPLICATION(S)

This application claims priority to and the benefit of U.S. Provisional Application Patent Ser. No. 63/397,454, filed Aug. 12, 2022, the entire disclosure of which is hereby incorporated by reference.

TECHNICAL FIELD

This disclosure relates to an image capture device that includes multiple interconnect mechanisms to connect to a mounting component.

BACKGROUND

An image capture device may be mounted to a mounting surface with a mounting component using an interconnect mechanism. Based on the relative locations of the interconnect mechanism, the mounting component, and the mounting surface, the image capture device may impart an undesirable torque to the mounting surface.

SUMMARY

Disclosed herein are implementations of an image capture device with a body including a front surface positioned opposite a back surface and a top surface positioned opposite a bottom surface. The back surface defines a recess having a recessed surface that is positioned between the front surface and the back surface, and a lens is coupled to the front surface. A first interconnect mechanism is rotatably coupled to the bottom surface, has a collapsed position and an extended position, and extends away from the bottom surface in both the extended position and the collapsed position. A second interconnect mechanism is rotatably coupled to the recessed surface, has a collapsed position and an extended position, and extends away from the back surface in the extended position and is approximately flush with the back surface in the collapsed position.

In certain embodiments, the back surface includes fins configured to dissipate heat.

In certain embodiments, in a first configuration the first interconnect mechanism is configured to connect to a mounting component that is coupled to a mounting surface, and in a second configuration the second interconnect mechanism is configured to connect to the mounting component. A torque imparted to the mounting surface by the image capture device is smaller when in the second configuration than when in the first configuration.

In certain embodiments, in a first configuration the first interconnect mechanism is configured to connect to a mounting component that is coupled to a mounting surface, and in a second configuration the second interconnect mechanism is configured to connect to the mounting component. A distance from the mounting surface to a center of mass the image capture device is smaller when in the second configuration than when in the first configuration.

In certain embodiments, the first interconnect mechanism includes folding protrusions that are configured to rotate toward each other to move from the collapsed position to the extended position.

In certain embodiments, the second interconnect mechanism includes folding protrusions that are configured to rotate toward each other to move from the collapsed position to the extended position.

In a second implementation, a camera housing includes a first surface and a second surface noncoplanar with the first surface. A first interconnect mechanism is coupled to the first surface and rotatable between a collapsed position and an extended position. In the collapsed position, protrusions of the first interconnect mechanism extend parallel to the first surface. In the extended position, the protrusions of the first interconnect mechanism extend in a perpendicular manner away from the first surface. A second interconnect mechanism is coupled to the second surface.

In a third implementation, the image capture device includes a body, an image sensor, and a lens coupled to the body that directs light along an optical axis onto the image sensor. A first interconnect mechanism coupled to the body includes a first protrusion and a second protrusion. The first protrusion is rotatable between a collapsed position and an extended position about a first axis of rotation that is parallel to the optical axis. The second protrusion is rotatable between a collapsed position and an extended position about a second axis of rotation that is parallel to the optical axis. A second interconnect mechanism coupled to the body includes a third protrusion and a fourth protrusion. The third protrusion is rotatable between a collapsed position and an extended position about a third axis of rotation that is perpendicular to the optical axis. The fourth protrusion is rotatable between a collapsed position and an extended position about a fourth axis of rotation that is perpendicular to the optical axis.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The present disclosure describes an image capture device that provides a user the ability to mount the image capture device to a structure in various orientations. The image capture device includes a first interconnect mechanism and a second interconnect mechanism that are configured to connect to a mating component that is coupled to a mating surface. The first interconnect mechanism and the second interconnect mechanism are arranged on surfaces of the image capture device that are perpendicular to each other.

In some implementations, the mating surface includes a helmet, and the image capture device is coupled to the helmet to capture images and/or video as a user wearing the helmet performs an activity (e.g., biking, skydiving, skiing, boating, etc.). The mating component may be secured to the helmet in various orientations such that a position and/or orientation of the image capture device is based on the position of the mating component relative to the helmet.

Figure 1A:
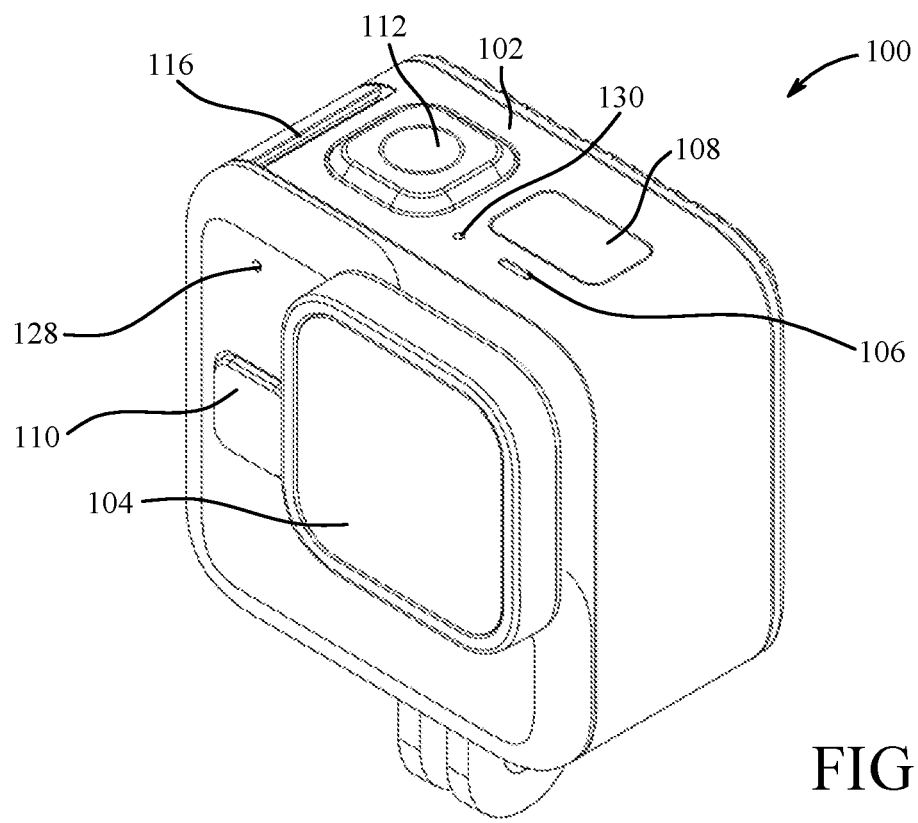
FIGS. 1A-1B are isometric views of an example of an image capture device.
Figure 1B:
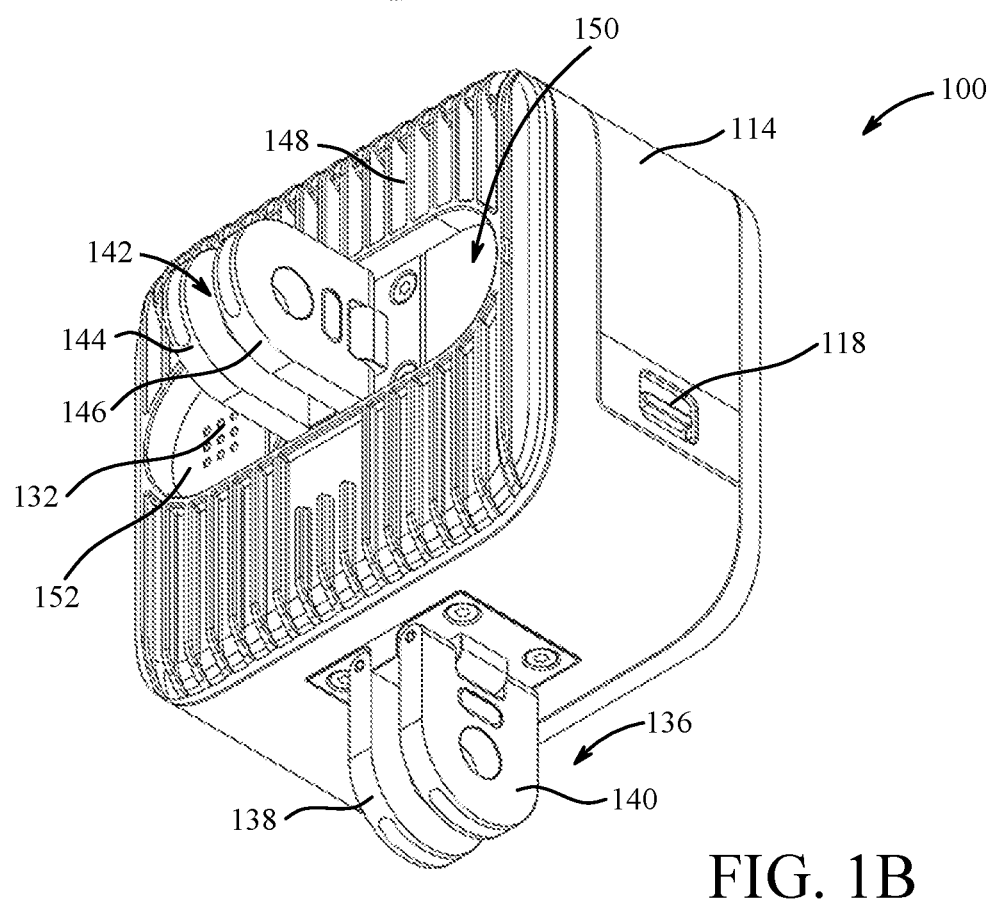

FIGS. 1A-1B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like, not shown), various input mechanisms (such as buttons, switches, and/or touchscreens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of an indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal (not shown) and a battery interface (not shown). When the door 114 is an open position, access is provided to an input-output (I/O) interface (not shown) for connecting to or communicating with external devices as described below, to a battery receptacle (not shown) for placement and replacement of a battery (not shown), and to an external memory slot (not shown) configured to receive an external memory device (e.g., a memory card such as an SD card, a microSD card, an SDHC card, an SDXC card, or any other type of external memory device configured to be received by the external memory slot). The battery receptacle includes operative connections (not shown) for power transfer between the battery and the image capture device 100. The external memory slot includes operative connections (not shown) for reading and writing data to an external memory device such that videos can be stored on, and retrieved from, the external memory device. When the door 114 is in a closed position, the seal engages a flange (not shown) or other interface to provide an environmental seal, and the battery interface engages the battery to secure the battery in the battery receptacle. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a top surface. The image capture device 100 may include other microphones on other surfaces (not shown). The microphones 128, 130 may be configured to receive and record audio signals in conjunction with recording video or separate from recording of video. The image capture device 100 may include a speaker 132 on a recessed surface of the image capture device 100. The image capture device 100 may include other speakers on other surfaces (not shown). The speaker 132 may be configured to play back recorded audio or emit sounds associated with notifications.

A bottom surface of the image capture device 100 may include a first interconnect mechanism 136 for connecting the image capture device 100 to a handle grip or other securing device such as a mating component. In the example shown in FIG. 1B, the first interconnect mechanism 136 includes folding protrusions (e.g., a folding protrusion 138 and a folding protrusion 140) configured to move between a nested or collapsed position (not shown) and an extended or open position as shown that facilitates coupling of the folding protrusions 138, 140 to mating protrusions of other devices such as handle grips, mounts, clips, or like devices. To move between the nested or collapsed position and the extended or open position, the folding protrusions 138, 140 are configured to rotate toward and away from each other, respectively. When in both the collapsed and extended positions, the first interconnect mechanism 136 extends away from the bottom surface of the image capture device 100. In the collapsed position, the folding protrusions 138, 140 may include coplanar surfaces and extend adjacent to the bottom surface of the image capture device 100. In other words, in the collapsed position, the folding protrusions 138, 140 extend away from each other in a common plane located below a plane extending through a bottom surface of the image capture device 100. In the extended position, the folding protrusions 138, 140 may extend perpendicularly away from the bottom surface of the image capture device 100.

A back surface of the image capture device 100 may define a recess 150 that has a recessed surface 152. A second interconnect mechanism 142 for connecting the image capture device 100 to a handle grip or other securing device may be rotatably coupled to the recessed surface 152. In the example shown in FIG. 1B, the second interconnect mechanism 142 includes folding protrusions (e.g., a folding protrusion 144 and a folding protrusion 146) configured to move between a nested or collapsed position (not shown) and an extended or open position as shown that facilitates coupling of the folding protrusions 144, 146 to mating protrusions of other devices such as handle grips, mounts, clips, or like devices. When in the nested or collapsed position, an outer surface of the second interconnect mechanism 142 is approximately flush with the back surface of the image capture device 100. The back surface of the image capture device includes fins 148 that are configured to dissipate heat generated by the internal components of the image capture device 100. In some implementations, an outer surface of the second interconnect mechanism 142 is approximately flush with the fins 148 when the second interconnect mechanism 142 is in the collapsed position. To move between the nested or collapsed position and the extended or open position, the folding protrusions 144, 146 are configured to rotate toward and away from each other, respectively.

In some implementations, the folding protrusions 138, 140 of the first interconnect mechanism 136 and the folding protrusions 144, 146 of the second interconnect mechanism 142 are approximately the same size (e.g., length, width, thickness, etc.). In their extended positions, the folding protrusions 144, 146 of the second interconnect mechanism 142 do not extend as far from the back surface of the image capture device 100 as do the folding protrusions 138, 140 of the first interconnect mechanism 136 from the bottom surface of the image capture device 100. This occurs because the folding protrusions 144, 146 of the second interconnect mechanism 142 are coupled to the recessed surface 152 whereas the folding protrusions 138, 140 of the first interconnect mechanism 136 are coupled to the bottom surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular or square cuboid. Furthermore, both the front and rear surfaces of the image capture device 100 are rectangular or square. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal—oxide— semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., an I/O interface). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2:
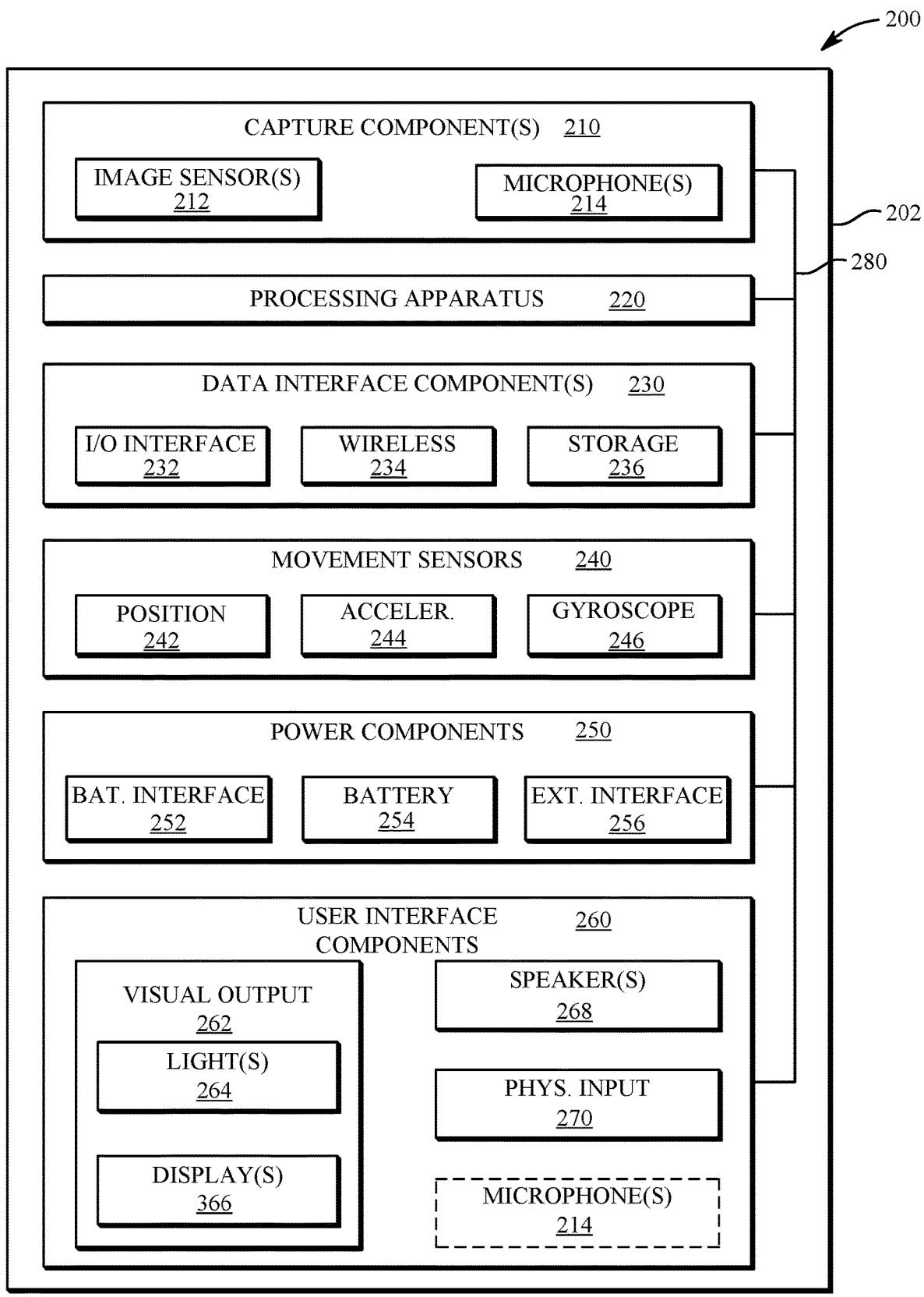
FIG. 2 is a block diagram of electronic components of an image capture device.

FIG. 2 is a block diagram of electronic components in an image capture device 200. The image capture device 200 may be a single-lens image capture device, a multi-lens image capture device, or variations thereof, including an image capture device with multiple capabilities such as use of interchangeable integrated sensor lens assemblies. The description of the image capture device 200 is also applicable to the image capture device 100 of FIGS. 1A-B.

The image capture device 200 includes a body 202 which includes electronic components such as capture components 210, a processing apparatus 220, data interface components 230, movement sensors 240, power components 250, and/or user interface components 260.

The capture components 210 include one or more image sensors 212 for capturing images and one or more microphones 214 for capturing audio.

The image sensor(s) 212 is configured to detect light of a certain spectrum (e.g., the visible spectrum or the infrared spectrum) and convey information constituting an image as electrical signals (e.g., analog or digital signals). The image sensor(s) 212 detects light incident through a lens coupled or connected to the body 202. The image sensor(s) 212 may be any suitable type of image sensor, such as a charge-coupled device (CCD) sensor, active pixel sensor (APS), complementary metal-oxide-semiconductor (CMOS) sensor, N-type metal—oxide— semiconductor (NMOS) sensor, and/or any other image sensor or combination of image sensors. Image signals from the image sensor(s) 212 may be passed to other electronic components of the image capture device 200 via a bus 280, such as to the processing apparatus 220. In some implementations, the image sensor(s) 212 includes a digital-to-analog converter. A multi-lens variation of the image capture device 200 can include multiple image sensors 212.

The microphone(s) 214 is configured to detect sound, which may be recorded in conjunction with capturing images to form a video. The microphone(s) 214 may also detect sound in order to receive audible commands to control the image capture device 200.

The processing apparatus 220 may be configured to perform image signal processing (e.g., filtering, tone mapping, stitching, and/or encoding) to generate output images based on image data from the image sensor(s) 212. The processing apparatus 220 may include one or more processors having single or multiple processing cores. In some implementations, the processing apparatus 220 may include an application specific integrated circuit (ASIC). For example, the processing apparatus 220 may include a custom image signal processor. The processing apparatus 220 may exchange data (e.g., image data) with other components of the image capture device 200, such as the image sensor(s) 212, via the bus 280.

The processing apparatus 220 may include memory, such as a random-access memory (RAM) device, flash memory, or another suitable type of storage device, such as a non-transitory computer-readable memory. The memory of the processing apparatus 220 may include executable instructions and data that can be accessed by one or more processors of the processing apparatus 220. For example, the processing apparatus 220 may include one or more dynamic random-access memory (DRAM) modules, such as double data rate synchronous dynamic random-access memory (DDR SDRAM). In some implementations, the processing apparatus 220 may include a digital signal processor (DSP). More than one processing apparatus may also be present or associated with the image capture device 200.

The data interface components 230 enable communication between the image capture device 300 and other electronic devices, such as a remote control, a smartphone, a tablet computer, a laptop computer, a desktop computer, or a storage device. For example, the data interface components 230 may be used to receive commands to operate the image capture device 200, transfer image data to other electronic devices, and/or transfer other signals or information to and from the image capture device 200. The data interface components 230 may be configured for wired and/or wireless communication. For example, the data interface components 230 may include an I/O interface 232 that provides wired communication for the image capture device 200, which may be a USB interface (e.g., USB type-C), a high-definition multimedia interface (HDMI), or a FireWire interface. The data interface components 230 may include a wireless data interface 234 that provides wireless communication for the image capture device 200, such as a Bluetooth interface, a ZigBee interface, and/or a Wi-Fi interface. The data interface components 230 may include a storage interface 236, such as a memory card slot configured to receive and operatively couple to a storage device (e.g., a memory card) for data transfer with the image capture device 200 (e.g., for storing captured images and/or recorded audio and video).

The movement sensors 240 may detect the position and movement of the image capture device 200. The movement sensors 240 may include a position sensor 242, an accelerometer 244, or a gyroscope 246. The position sensor 242, such as a global positioning system (GPS) sensor, is used to determine a position of the image capture device 200. The accelerometer 244, such as a three-axis accelerometer, measures linear motion (e.g., linear acceleration) of the image capture device 200. The gyroscope 246, such as a three-axis gyroscope, measures rotational motion (e.g., rate of rotation) of the image capture device 200. Other types of movement sensors 240 may also be present or associated with the image capture device 200.

The power components 250 may receive, store, and/or provide power for operating the image capture device 200. The power components 250 may include a battery interface 252 and a battery 254. The battery interface 252 operatively couples to the battery 254, for example, with conductive contacts to transfer power from the battery 254 to the other electronic components of the image capture device 200. The power components 250 may also include an external interface 256, and the power components 250 may, via the external interface 256, receive power from an external source, such as a wall plug or external battery, for operating the image capture device 200 and/or charging the battery 254 of the image capture device 200. In some implementations, the external interface 256 may be the I/O interface 232. In such an implementation, the I/O interface 232 may enable the power components 250 to receive power from an external source over a wired data interface component (e.g., a USB type-C cable).

The user interface components 260 may allow the user to interact with the image capture device 200, for example, providing outputs to the user and receiving inputs from the user. The user interface components 260 may include visual output components 262 to visually communicate information and/or present captured images to the user. The visual output components 262 may include one or more lights 264 and/or more displays 266. The display(s) 266 may be configured as a touch screen that receives inputs from the user. The user interface components 260 may also include one or more speakers 268. The speaker(s) 268 can function as an audio output component that audibly communicates information and/or presents recorded audio to the user. The user interface components 260 may also include one or more physical input interfaces 270 that are physically manipulated by the user to provide input to the image capture device 200. The physical input interfaces 270 may, for example, be configured as buttons, toggles, or switches. The user interface components 260 may also be considered to include the microphone(s) 214, as indicated in dotted line, and the microphone(s) 214 may function to receive audio inputs from the user, such as voice commands.

Figure 3:
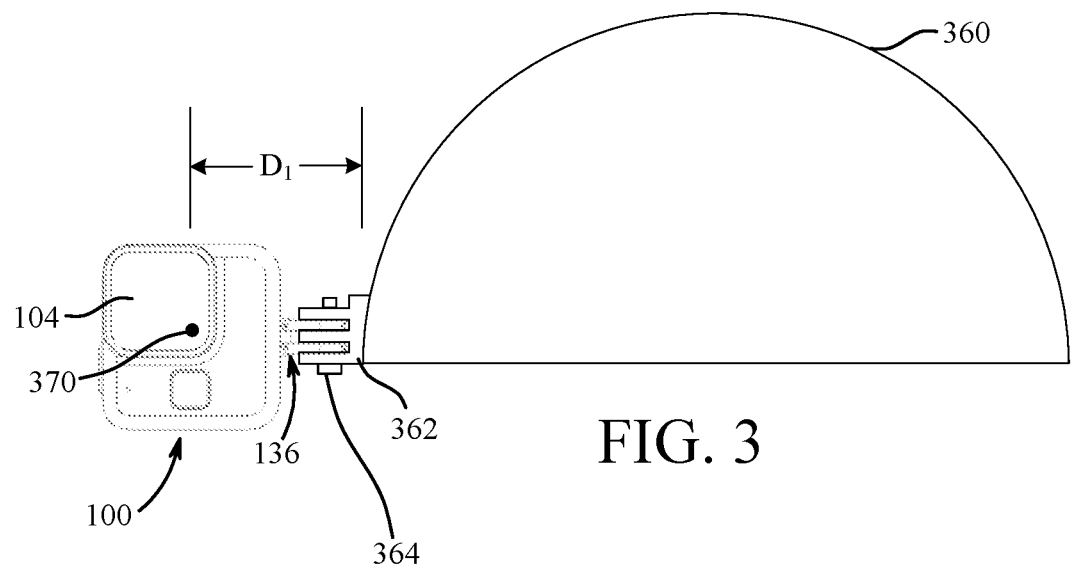
FIG. 3 is an illustration of the image capture device of FIG. 1 coupled to a helmet in a first configuration.

FIG. 3 is an illustration of the image capture device 100 of FIG. 1 coupled to a helmet 360 in a first configuration. A user may desire to wear the helmet 360 when performing an activity, such as biking, skydiving, boating, skiing, etc., and may desire to record a video of the activity to share with others (e.g., via social media, private messages, etc.). Prior to donning the helmet 360, the user may secure a mounting component 362 to a mounting surface (e.g., an external surface) of the helmet 360 in a desired orientation. As shown in FIG. 3, the user may secure the mounting component 362 to the helmet 360 on a side of the helmet 360 such that the mounting component 362 extends from the helmet 360 in a direction approximately perpendicular to the face of the user. To couple the image capture device 100 to the helmet 360, the first interconnect mechanism 136 interfaces with the mounting component 362 and is secured to the mounting component 362 with a connector 364 (e.g., a threaded connector such as a thumbscrew, set screw, etc.). Assembled as shown, when the user wears the helmet 360, the device 100 is positioned to a side of the head of the user (e.g., near an ear of the user). In this configuration, the lens 104 will capture a viewpoint that would be adjacent to a given side (vs. aligned with) a viewpoint of the user wearing the helmet 360.

As shown in FIG. 3, $D_1$ indicates a first distance (e.g., a perpendicular distance) between the outer surface of the helmet 360 and a center of mass 370 of the image capture device 100. Oriented as shown in FIG. 3, the image capture device 100 imparts a torque $T_1$ to the mounting surface of the helmet 360 that is equal to the weight of the image capture device 100 (e.g., the mass of the image capture device 100 multiplied by the gravitational acceleration) multiplied by $D_1$. To counteract the torque $T_1$ and prevent the helmet 360 from rotating in the direction of the torque $T_1$, the user's neck must exert a torque that is equal and opposite to that imparted to the outer surface of the helmet 360 by the image capture device 100. Over time, the user may tire from exerting this counteracting torque.

In addition, the user may desire to record the activity to provide a "first person view" of the activity. For example, when another person views the video, the user desires for the other person to view the activity through the eyes of the user (e.g., to feel as though the other person is actually performing the activity). However, mounting the image capture device 100 as described in FIG. 3 causes the lens 104 to be positioned away from the eyes of the user, and the other person may not feel as though they are actually performing the activity when they view the recorded video.

Figure 4:
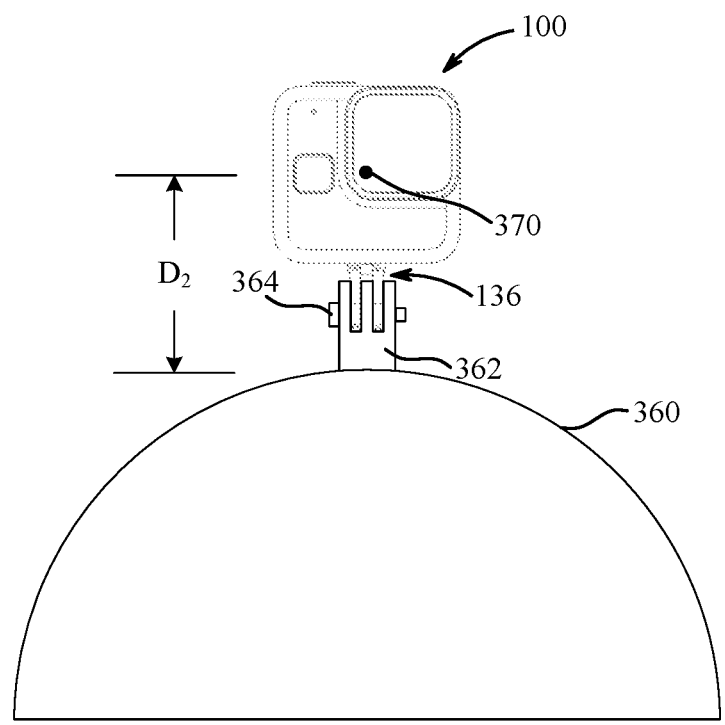
FIG. 4 is an illustration of the image capture device of FIG. 1 coupled to the helmet in a second configuration.

FIG. 4 is an illustration of the image capture device 100 of FIG. 1 coupled to the helmet 360 in a second configuration. The user may secure the mounting component 362 to the helmet 360 on a top of the helmet 360 such that the mounting component 362 extends from the helmet 360 in a direction approximately parallel to the face of the user. To couple the image capture device 100 to the helmet 360, the first interconnect mechanism 136 interfaces with the mounting component 362 and is secured to the mounting component 362 with the connector 364. Assembled as shown, when the user wears the helmet 360, the image capture device 100 is positioned above the head of the user (e.g., above a top of the head of the user and approximately centered over the head of the user).

As shown in FIG. 4, $D_2$ indicates a second distance (e.g., a perpendicular distance) between the outer surface of the helmet 360 and the center of mass 370 of the image capture device 100. When the user's face is straight (e.g., facing straight ahead, etc.) the image capture device 100 does not impart a torque to the mounting surface of the helmet 360. In some implementations, when the user looks up, looks down, tilts the user's head to the right, to the left, etc., the image capture device 100 imparts a torque $T_2$ to the mounting surface of the helmet 360 that is equal to the weight of the image capture device 100 (e.g., the mass of the image capture device 100 multiplied by the gravitational acceleration) multiplied by $D_2$. To counteract the torque $T_2$ and prevent the helmet 360 from over-rotating in the direction of the torque $T_2$, the user's neck must exert a torque that is equal and opposite to that imparted to the outer surface of the helmet 360 by the image capture device 100. Over time, the user may tire from exerting this counteracting torque.

In this configuration, the lens 104 will capture a viewpoint that would be vertically offset from (vs. aligned with) a viewpoint of the user wearing the helmet 360 (e.g., the image capture device 100 is positioned above the head of the user). Accordingly, the image capture device 100 may also provide a perspective that does not make the other person feel as though they are actually performing the activity when they view the recorded video.

Figure 5:
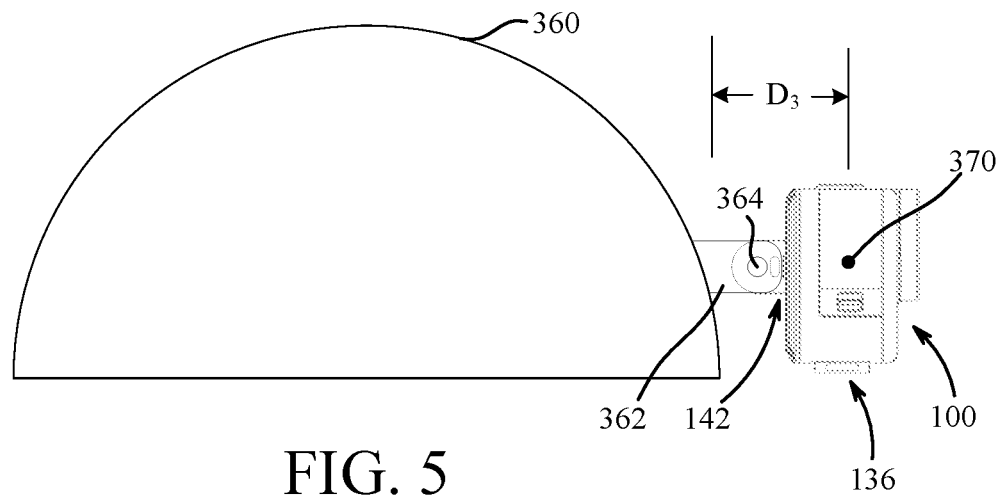
FIG. 5 is an illustration of the image capture device of FIG. 1 coupled to the helmet in a third configuration.

FIG. 5 is an illustration of the image capture device 100 of FIG. 1 coupled to the helmet 360 in a third configuration. The user may secure the mounting component 362 to the helmet 360 on the front of the helmet 360 such that the mounting component 362 extends from the helmet 360 in a direction approximately parallel to the nose of the user. To couple the image capture device 100 to the helmet 360, the second interconnect mechanism 142 interfaces with the mounting component 362 and is secured to the mounting component 362 with the connector 364. Assembled as shown, when the user wears the helmet 360 the image capture device 100 is positioned in front of the head of the user (e.g., approximately in front of the eyes of the user). Positioned as described, the image capture device 100 may provide a view that more closely resembles the view of the user when another person views the captured video.

As shown in FIG. 5, $D_3$ indicates a third distance (e.g., a perpendicular distance) between the outer surface of the helmet 360 and the center of mass 370 of the image capture device 100. Oriented as shown in FIG. 5, the image capture device 100 imparts a torque $T_3$ to the mounting surface of the helmet 360 that is equal to the weight of the image capture device 100 (e.g., the mass of the image capture device 100 multiplied by the gravitational acceleration) multiplied by $D_3$. To counteract the torque $T_3$ and prevent the helmet 360 from rotating in the direction of the torque $T_3$, the user's neck must exert a torque that is equal and opposite to that imparted to the outer surface of the helmet 360 by the image capture device 100.

When in the extended position, the folding protrusions 144, 146 extend from the back surface of the image capture device 100 a shorter distance than the folding protrusions 138, 140 extend from the bottom surface of the image capture device 100. Accordingly, when mounting the image capture device 100 to the helmet 360 (or another mounting surface and/or component) using the second interconnect mechanism 142, the image capture device 100 is closer to the helmet 360 than when using the first interconnect mechanism 136. For example, the distance $D_3$ is smaller than both distances $D_2$ and $D_1$ because the distance $D_3$ is a result of using the second interconnect mechanism 142 instead of using the first interconnect mechanism 136. Therefore, the torque $T_3$ is also smaller than both torques $T_2$ and $T_1$. Using the second interconnect mechanism 142 may be more comfortable for the user because less effort from the user is required to counteract the torque $T_3$ than to counteract the torques $T_2$ and $T_1$.

Furthermore, using the second interconnect mechanism 142 allows the user to mount the image capture device 100 closer to the helmet 360 than when using the first interconnect mechanism 136. The position and orientation of the second interconnect mechanism 142 also allows the image capture device 100 to be mounted closer to the eyes of the user than when using the first interconnect mechanism 136. Accordingly, the view from the lens 104 when using the second interconnect mechanism 142 may be closer to a "first person view" than the views provided when using the first interconnect mechanism 136 and may provide another user a more immersive experience when viewing the recorded video.

Figure 6:
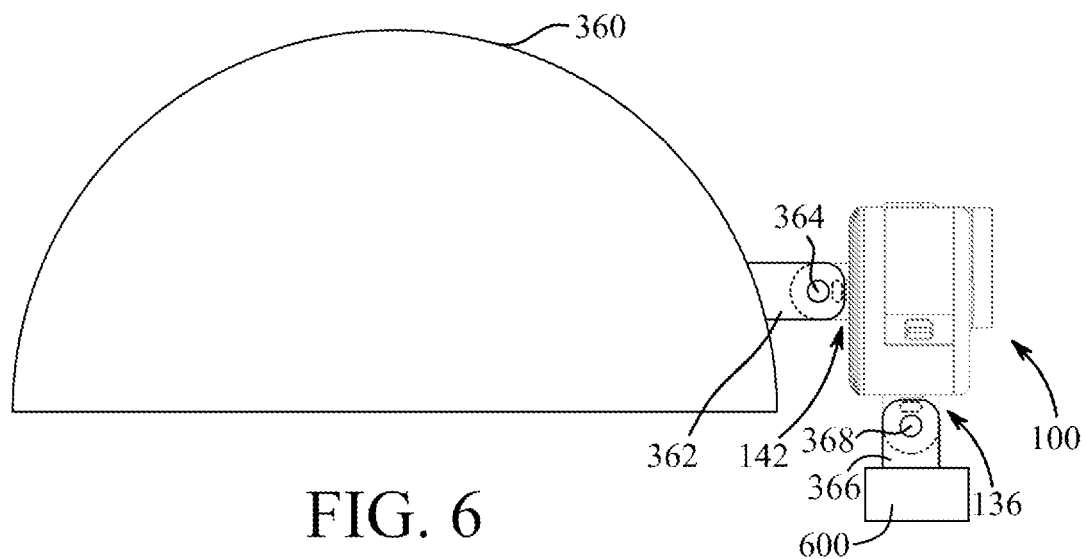
FIG. 6 is an illustration of the image capture device of FIG. 1 coupled to the helmet in a fourth configuration with an accessory mounted to the image capture device.

FIG. 6 is an illustration of the image capture device of FIG. 1 coupled to the helmet 360 in a fourth configuration with an accessory 600 mounted to the image capture device 100. Though a helmet 360 is shown, the mating surface may be another item, like a chest harness, a necklace, a wrist mount, a headband, etc.

In some implementations, both the first interconnect mechanism 136 and the second interconnect mechanism 142 are connected to a mating component that is coupled to a mating surface. For example, the first interconnect mechanism 136 may be coupled to the helmet 360 via the mounting component 362 and the connector 364 while the second interconnect mechanism 142 may be coupled to the accessory 600 via a mounting component 366 and a connector 368. In another example, such as shown in FIG. 6, the second interconnect mechanism 142 may be coupled to the helmet 360 via the mounting component 362 and the connector 364 while the first interconnect mechanism 136 may be coupled to the accessory 600 via the mounting component 366 and the connector 368.

The accessory 600 may be an external microphone, a light, a speaker, an external battery, an external display, an external memory, a wireless communication device, a second camera, or the like. The accessory 600 may include or be coupled to the mounting component 366 and the connector 368 may be used with the mounting component 366 to secure the accessory 600 to the image capture device 100. For example, the connector 368 may be a screw, a magnet, a rod, etc.

In some implementations, the first interconnect mechanism 136 and/or the second interconnect mechanism 142 may include an electrical terminal configured to connect with an electrical terminal on a mating component of another device such as the accessory 600, a handle grip, a mount, a clips, or another device. The electrical terminal(s) on the first interconnect mechanism 136 and/or the second interconnect mechanism 142 may be electrically connected to components of the image capture device 100, such as the data interface components 230 (i.e., the I/O interface 232, the wireless data interface 234, and/or the storage interface 236) and the power components 250 (i.e., the battery interface 252, the battery 254, and/or the external interface 256).

When the electrical terminal on the mating component of the other device is connected to the electrical terminal on the first interconnect mechanism 136 or the second interconnect mechanism 142, the other device may be connected to components of the image capture device 100. For example, when the accessory 600 includes a light connected to the first interconnect mechanism 136, the light may draw power from the battery 254 of the image capture device 100. In another example, when the accessory 600 includes an external memory connected to the image capture device 100 via the second interconnect mechanism 142, the external memory may receive data from the data interface components 230 of the image capture device 100.

In some implementations, both the first interconnect mechanism 136 and the second interconnect mechanism 142 may be mounted to a mating component on the same mounting surface. For example, both the first interconnect mechanism and the second interconnect mechanism may be connected to the helmet 360 at different locations or at the same location at different times. Mounting the image capture device 100 using the multiple interconnect mechanisms 136, 142 may increase the stability and versatility of the image capture device 100 and may improve captured images.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. An image capture device, comprising:
  a body including a front surface positioned opposite a back surface and a top surface positioned opposite a bottom surface, wherein the back surface defines a recess having a recessed surface that is positioned between the front surface and the back surface;
  a lens coupled to the front surface;
  a first interconnect mechanism rotatably coupled to the bottom surface and having a collapsed position and an extended position, wherein the first interconnect mechanism extends away from the bottom surface in both the extended position and the collapsed position; and a second interconnect mechanism rotatably coupled to the recessed surface and having a collapsed position and an extended position, wherein the second interconnect mechanism extends away from the back surface in the extended position and is approximately flush with the back surface in the collapsed position.

2. The image capture device of claim 1, wherein the back surface includes fins configured to dissipate heat.

3. The image capture device of claim 1, wherein in a first configuration of the image capture device, the first interconnect mechanism is configured to connect to a mounting component, wherein in a second configuration of the image capture device, the second interconnect mechanism is configured to connect to the mounting component, and wherein a torque imparted to the mounting component by the image capture device is less when the image capture device is in the second configuration than when the image capture device is in the first configuration.

4. The image capture device of claim 1, wherein in a first configuration of the image capture device, the first interconnect mechanism is configured to connect to a mounting component, wherein in a second configuration of the image capture device, the second interconnect mechanism is configured to connect to the mounting component, and wherein a distance from the mounting component to a center of mass the image capture device is less when the image capture device is in the second configuration than when the image capture device is in the first configuration.

5. The image capture device of claim 1, wherein the first interconnect mechanism includes folding protrusions that are configured to rotate toward each other to move from the collapsed position to the extended position.

6. The image capture device of claim 5, wherein the second interconnect mechanism includes folding protrusions that are configured to rotate toward each other to move from the collapsed position to the extended position.

7. A camera housing, comprising:
a first surface;
a second surface noncoplanar with the first surface;
a first interconnect mechanism coupled to the first surface and rotatable between a collapsed position where protrusions of the first interconnect mechanism extend parallel to the first surface and an extended position where the protrusions of the first interconnect mechanism extend in a perpendicular manner away from the first surface; and
a second collapsible interconnect mechanism coupled to the second surface.

8. The camera housing of claim 7, wherein the second interconnect mechanism comprises protrusions configured to connect to a mounting component that is coupled to a mounting surface.

9. The camera housing of claim 8, wherein the protrusions of the second interconnect mechanism are rotatable between a collapsed position and an extended position.

10. The camera housing of claim 9, wherein the protrusions of the second interconnect mechanism include coplanar surfaces and extend adjacent to the second surface in the collapsed position and extend in a perpendicular manner away from the second surface in the extended position.

11. The camera housing of claim 7, wherein the first surface defines a recess and the protrusions of the first interconnect mechanism are at least partially disposed within the recess in the collapsed position.

12. The camera housing of claim 7, wherein the first interconnect mechanism is configured to mount an accessory to the camera housing.

13. The camera housing of claim 7, wherein in a first configuration of the camera housing, the first interconnect mechanism is configured to connect to a mounting component and the second interconnect mechanism is configured to connect to an accessory, and in a second configuration of the camera housing, the second interconnect mechanism is configured to connect to the mounting component and the first interconnect mechanism is configured to connect to an accessory.

14. An image capture device, comprising:
a body;
an image sensor;
a lens coupled to the body that directs light along an optical axis and onto the image sensor;
a first interconnect mechanism coupled to the body, the first interconnect mechanism comprising:
a first protrusion rotatable between a collapsed position and an extended position about a first axis of rotation that is parallel to the optical axis; and
a second protrusion rotatable between a collapsed position and an extended position about a second axis of rotation that is parallel to the optical axis; and
a second interconnect mechanism coupled to the body, the second interconnect mechanism comprising:
a third protrusion rotatable between a collapsed position and an extended position about a third axis of rotation that is perpendicular to the optical axis; and
a fourth protrusion rotatable between a collapsed position and an extended position about a fourth axis of rotation that is parallel to the optical axis;
wherein:
the body comprises a first surface and a second surface perpendicular to the first surface;
the first interconnect mechanism is coupled to the first surface; and
the second interconnect mechanism is coupled to the second surface.

15. The image capture device of claim 14, wherein the second surface includes fins configured to dissipate heat.

16. The image capture device of claim 14, wherein in a first configuration of the image capture device, the first interconnect mechanism is configured to connect to a mounting component, wherein in a second configuration of the image capture device, the second interconnect mechanism is configured to connect to the mounting component, and wherein a torque imparted to the mounting component by the image capture device is less when the image capture device is in the second configuration than when the image capture device is in the first configuration.

17. The image capture device of claim 14, wherein the first protrusion and the second protrusion extend along an outer surface of the body in the collapsed position and extend in a perpendicular manner away from the body in the extended position.

18. The image capture device of claim 17, wherein the third protrusion and the fourth protrusion are approximately flush with an outer surface of the body in the collapsed position and extend away from the body in the extended position.

19. The image capture device of claim 14, wherein to rotate between the collapsed position and the extended position, the first protrusion is rotatable about the first axis in a direction opposite a direction the second protrusion is rotatable about the second axis, and wherein to rotate between the collapsed position and the extended position, the third protrusion is rotatable about the third axis in a direction opposite a direction the fourth protrusion is rotatable about the fourth axis.

* * * * *